(12) United States Patent
Uchiyama et al.

(10) Patent No.: US 11,197,180 B2
(45) Date of Patent: Dec. 7, 2021

(54) TERMINAL APPARATUS, METHOD, AND RECORDING MEDIUM

(71) Applicant: SONY CORPORATION, Tokyo (JP)

(72) Inventors: Hiromasa Uchiyama, Tokyo (JP); Kazuyuki Shimezawa, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/462,722

(22) PCT Filed: Oct. 26, 2017

(86) PCT No.: PCT/JP2017/038741
§ 371 (c)(1),
(2) Date: May 21, 2019

(87) PCT Pub. No.: WO2018/105263
PCT Pub. Date: Jun. 14, 2018

(65) Prior Publication Data
US 2019/0373493 A1    Dec. 5, 2019

(30) Foreign Application Priority Data
Dec. 8, 2016 (JP) .............................. JP2016-238270

(51) Int. Cl.
| | |
|---|---|
| *H04W 24/08* | (2009.01) |
| *H04L 12/24* | (2006.01) |
| *H04L 12/861* | (2013.01) |
| *H04W 8/00* | (2009.01) |
| *H04W 40/20* | (2009.01) |
| *H04W 88/06* | (2009.01) |
| *H04W 88/08* | (2009.01) |

(52) U.S. Cl.
CPC .......... *H04W 24/08* (2013.01); *H04L 41/5003* (2013.01); *H04L 49/90* (2013.01); *H04W 8/005* (2013.01); *H04W 40/20* (2013.01); *H04W 88/06* (2013.01); *H04W 88/08* (2013.01)

(58) Field of Classification Search
None
See application file for complete search history.

(56) References Cited

U.S. PATENT DOCUMENTS

| 10,531,365 B2* | 1/2020 | Kaur ..................... H04W 24/04 |
| 2007/0091825 A1* | 4/2007 | Budampati ............ H04B 1/713 370/255 |

(Continued)

FOREIGN PATENT DOCUMENTS

| CN | 102017714 A | 4/2011 |
| EP | 2245885 A1 | 11/2010 |

(Continued)

OTHER PUBLICATIONS

Extended European Search Report of EP Application No. 17878400.5, dated Oct. 9, 2019, 08 pages of EESR.

(Continued)

*Primary Examiner* — Christopher T Wyllie
(74) *Attorney, Agent, or Firm* — Chip Law Group

(57) ABSTRACT

Provided is a terminal apparatus including a processing unit that determines which of a base station or a relay terminal is set as a transmission destination for each packet based on whether or not a predetermined condition is satisfied.

18 Claims, 11 Drawing Sheets

(56) References Cited

U.S. PATENT DOCUMENTS

| | | | |
|---|---|---|---|
| 2009/0185492 A1* | 7/2009 | Senarath | H04W 40/22 370/238 |
| 2011/0255445 A1* | 10/2011 | Johnson | H04W 4/38 370/255 |
| 2012/0155376 A1 | 6/2012 | Senarath et al. | |
| 2012/0243711 A1* | 9/2012 | Fujita | H04H 60/04 381/119 |
| 2013/0010601 A1 | 1/2013 | Senarath et al. | |
| 2014/0313903 A1 | 10/2014 | Kikuzuki | |
| 2016/0066268 A1* | 3/2016 | Park | H04L 47/28 370/311 |
| 2016/0183145 A1* | 6/2016 | Chintada | H04W 36/18 370/331 |
| 2016/0366676 A1 | 12/2016 | Fujishiro et al. | |
| 2016/0366677 A1 | 12/2016 | Fujishiro et al. | |
| 2017/0041880 A1* | 2/2017 | Ouchi | H04W 52/146 |
| 2017/0086156 A1* | 3/2017 | Klatt | H04W 8/005 |
| 2018/0084478 A1 | 3/2018 | Lee et al. | |
| 2018/0255505 A1* | 9/2018 | Thyagarajan | H04W 36/03 |
| 2018/0332519 A1* | 11/2018 | Dou | H04W 36/165 |
| 2019/0253869 A1* | 8/2019 | Xu | H04W 40/246 |
| 2019/0320017 A1* | 10/2019 | Li | H04L 67/1065 |
| 2019/0373493 A1* | 12/2019 | Uchiyama | H04W 8/005 |
| 2020/0068580 A1* | 2/2020 | Tang | H04B 7/2606 |

FOREIGN PATENT DOCUMENTS

| | | |
|---|---|---|
| EP | 2571317 A1 | 3/2013 |
| EP | 3217759 A1 | 9/2017 |
| JP | 2011-514031 A | 4/2011 |
| JP | 2013-115446 A | 6/2013 |
| JP | 5230753 B2 | 7/2013 |
| JP | 2013-197887 A | 9/2013 |
| JP | 2014-216709 A | 11/2014 |
| JP | 2016-521076 A | 7/2016 |
| KR | 10-2010-0103857 A | 9/2010 |
| WO | 2009/092155 A1 | 7/2009 |
| WO | 2016/072469 A1 | 5/2016 |
| WO | 2016/163733 A1 | 10/2016 |
| WO | 2016/185967 A1 | 11/2016 |

OTHER PUBLICATIONS

International Search Report and Written Opinion of PCT Application No. PCT/JP2017/038741, dated Nov. 28, 2017, 11 pages of ISRWO.

* cited by examiner

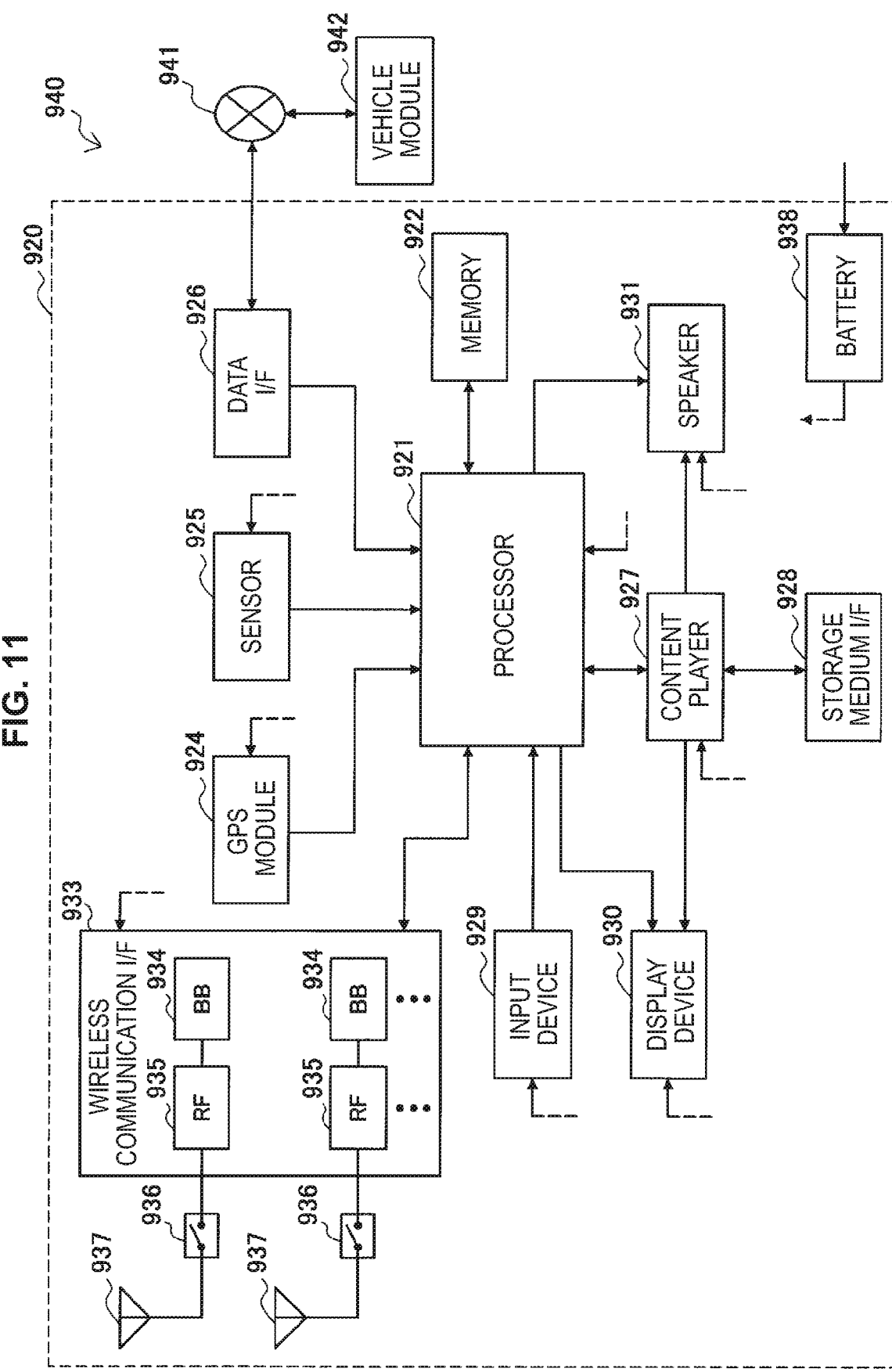

TERMINAL APPARATUS, METHOD, AND RECORDING MEDIUM

CROSS REFERENCE TO RELATED APPLICATIONS

This application is a U.S. National Phase of International Patent Application No. PCT/JP2017/038741 filed on Oct. 26, 2017, which claims priority benefit of Japanese Patent Application No. JP 2016-238270 filed in the Japan Patent Office on Dec. 8, 2016. Each of the above-referenced applications is hereby incorporated herein by reference in its entirety.

TECHNICAL FIELD

The present disclosure relates to a terminal apparatus, a method, and a recording medium.

BACKGROUND ART

In recent years, development relating to internet of things (IoT) has been actively performed. In IoT, wireless communication is important technical theme because information is exchanged by various objects being connected to a network. Therefore, in third generation partnership project (3GPP), communication for IoT which realizes a smaller packet, lower power consumption or lower cost, such as machine type communication (MTC) and narrow band IoT (NB-IoT) is being standardized.

In communication for IoT, it is desirable to secure a wide coverage with power consumption as low as possible. However, typically, because there is tradeoff relationship between power consumption and a coverage, if a wider coverage is tried to be secured, power consumption necessarily increases. Therefore, as a technology for realizing both lower power consumption and a wider coverage, relay of communication using a relay terminal is being studied.

For example, the following Patent Literature 1 discloses a technology for selecting an appropriate relay terminal among candidates for the relay terminal in the case where a terminal apparatus performs communication with a base station via the relay terminal in an LTE-based access network.

CITATION LIST

Patent Literature

Patent Literature 1: JP 2016-521076T

DISCLOSURE OF INVENTION

Technical Problem

However, the technology disclosed in the above-described Patent Literature 1, or the like, is still in the early days of development, and it is difficult to say that technologies for utilizing a relay terminal in various situations are sufficiently proposed. For example, a technology for selecting a communication path more flexibly is one of the technologies which are not sufficiently proposed.

Therefore, the present disclosure proposes a mechanism which enables a terminal apparatus to select a communication path to a base station more flexibly.

Solution to Problem

According to the present disclosure, there is provided a terminal apparatus including: a processing unit configured to determine which of a base station or a relay terminal is set as a transmission destination for each packet in accordance with whether or not a predetermined condition is satisfied.

Moreover, according to the present disclosure, there is provided a terminal apparatus including: a processing unit configured to relay to the base station a packet received from another terminal apparatus which determines which of a base station or the terminal apparatus is set as a transmission destination for each packet in accordance with whether or not a predetermined condition is satisfied.

Moreover, according to the present disclosure, there is provided a method to be executed by a processor, the method including: determining which of a base station or a relay terminal is set as a transmission destination for each packet in accordance with whether or not a predetermined condition is satisfied.

Moreover, according to the present disclosure, there is provided a method to be executed by a terminal apparatus, the method including: relaying to the base station a packet received from another terminal apparatus which determines which of a base station or the terminal apparatus is set as a transmission destination for each packet in accordance with whether or not a predetermined condition is satisfied.

Moreover, according to the present disclosure, there is provided a recording medium having a program recorded thereon, the program causing a computer to function as a processing unit configured to determine which of a base station or a relay terminal is set as a transmission destination for each packet in accordance with whether or not a predetermined condition is satisfied.

Moreover, according to the present disclosure, there is provided a recording medium having a program recorded thereon, the program causing a computer which controls a terminal apparatus to function as a processing unit configured to cause a packet received by the terminal apparatus from another terminal apparatus which determines which of a base station or the terminal apparatus is set as a transmission destination for each packet in accordance with whether or not a predetermined condition is satisfied, to be relayed to the base station by the terminal apparatus.

Advantageous Effects of Invention

According to the present disclosure as described above, a mechanism which enables a terminal apparatus to select a communication path to a base station more flexibly is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a sequence illustrating an example of flow of bearer reuse processing to be executed in the system according to the present embodiment.

FIG. 11 is a block diagram illustrating an example of a schematic configuration of a car navigation device.

MODE(S) FOR CARRYING OUT THE INVENTION

Figure 1:
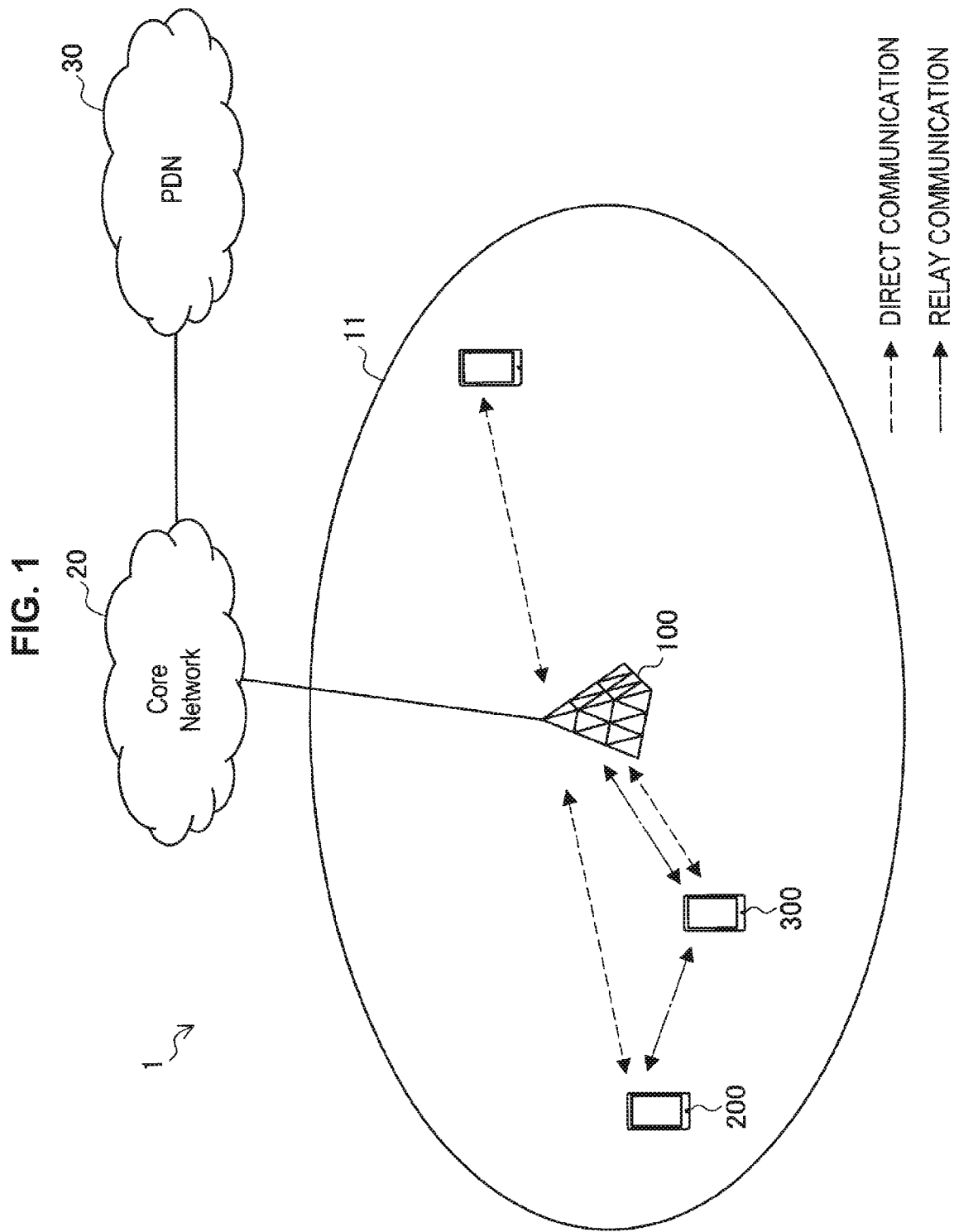
FIG. 1 is a diagram illustrating an example of an entire configuration of a system according to the present embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Configuration example
1.1. Entire configuration
1.2. Configuration example of remote terminal
1.3. Configuration example of relay terminal
2. Processing flow
3. Details of each processing
3.1. Relay terminal discovery processing
3.2. Transmission path switching
3.3. Relay communication
3.3.1. Bearer
3.3.2. Burst transmission
3.4. Incentive calculation
4. Application examples
5. Conclusion

1. Configuration Example

First, an entire configuration of a system according to an embodiment of the present disclosure will be described with reference to FIG. 1.
<1.1. Entire Configuration>

FIG. 1 is a diagram illustrating an example of an entire configuration of a system 1 according to the present embodiment. As illustrated in FIG. 1, the system 1 includes a base station 100, a terminal apparatus 200, a terminal apparatus 300, a core network 20 and a packet data network (PDN) 30.

The base station 100 operates a cell 11 and provides wireless service to one or more terminal apparatuses located inside the cell 11. For example, the base station 100 provides wireless service to each of the terminal apparatus 200 and the terminal apparatus 300. The cell 11 can be operated in accordance with an arbitrary wireless communication scheme such as, for example, LTE and new radio (NR). The base station 100 is connected to the core network 20. The core network 20 is connected to the PDN 30.

The core network 20 can include, for example, mobility management entity (MME), a serving gateway (S-GW), a PDN gateway (P-GW), a policy and charging rule function (PCRF) and a home subscriber server (HSS). The MME, which is a control node handling a signal of a control plane, manages a moving state of the terminal apparatus. The S-GW is a control node which handles a signal of a user plane, and is a gateway apparatus which switches a transfer path of user data. The P-GW is a control node which handles a signal of a user plane, and is a gateway apparatus which becomes a connection point between the core network 20 and the PDN 30. The PCRF is a control node which performs control relating to a policy such as quality of service (QoS) with respect to a bearer and charging. The HSS is a control node which handles subscriber data and performs service control.

The terminal apparatus 200 and the terminal apparatus 300 perform wireless communication with the base station 100 on the basis of control by the base station 100. The terminal apparatus 200 and the terminal apparatus 300 may be so-called user equipment (UE). For example, the terminal apparatus 200 and the terminal apparatus 300 transmit uplink signals to the base station 100 and receive downlink signals from the base station 100. Communication with the base station 100 without intervening another apparatus in this manner will be also referred to as direct communication.

Here, the terminal apparatus 300 has a function of relaying (that is, relay) communication from another apparatus or communication to another apparatus. For example, as illustrated in FIG. 1, the terminal apparatus 300 receives an uplink signal directed to the base station 100 from the terminal apparatus 200 and transfers the uplink signal to the base station 100, and receives a downlink signal directed to the terminal apparatus 200 from the base station 100 and transfers the downlink signal to the terminal apparatus 200. Communication with the base station 100 via another apparatus in this manner will be also referred to as relay communication. Note that, while FIG. 1 illustrates an example where one terminal apparatus 300 relays relay communication, two or more terminal apparatuses 300 may relay relay communication.

In the following description, the terminal apparatus 300 having a relay function will be also referred to as a relay terminal, and the terminal apparatus 200 which becomes a transmission source of an uplink signal or a transmission destination of a downlink signal will be also referred to as a remote terminal. The remote terminal 200 is, for example, an IoT device which performs low frequent communication. Further, the remote terminal 200 may be a smartphone, an in-vehicle terminal, a drone, or the like. In a similar manner, the relay terminal 300 can be also realized as, for example, an apparatus dedicated for relay, an IoT device, a smartphone, an in-vehicle terminal, a drone, or the like.

Note that, in the present specification, particularly, direct communication and relay communication relating to transmission of an uplink signal from the relay terminal 300 will be described.

Functional configuration examples of the remote terminal 200 and the relay terminal 300 will be described below with reference to FIG. 2 and FIG. 3. Note that the remote terminal 200 and the relay terminal 300 are described distinctively for the purpose of description, there can be a case where one terminal apparatus operates as a remote terminal and operates as a relay terminal. Therefore, a functional configuration example of a terminal apparatus in the case where the terminal apparatus operates as a remote terminal, and a functional configuration example of a terminal apparatus in the case where the terminal apparatus operates as a relay terminal will be respectively described below.

<1.2. Configuration Example of Remote Terminal>

Figure 2:
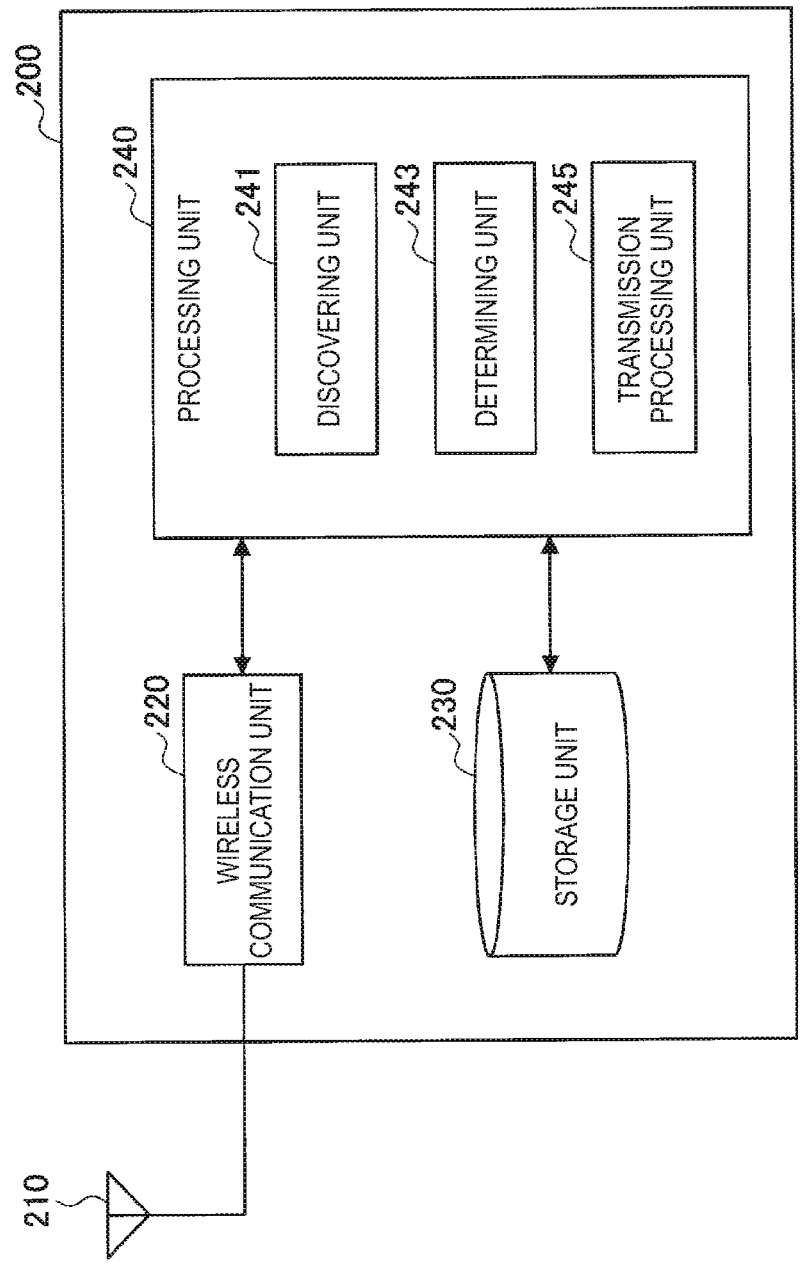
FIG. 2 is a block diagram illustrating an example of a configuration of a remote terminal according to the present embodiment.

FIG. 2 is a block diagram illustrating an example of a configuration of the remote terminal 200 according to the present embodiment. Referring to FIG. 2, the remote terminal 200 includes an antenna unit 210, a wireless communication unit 220, a storage unit 230 and a processing unit 240.

(1) Antenna Unit 210

The antenna unit 210 radiates a signal output from the wireless communication unit 220 to space as a radio wave. Further, the antenna unit 210 converts a radio wave in space into a signal and outputs the signal to the wireless communication unit 220.

(2) Wireless Communication Unit 220

The wireless communication unit 220 transmits/receives a signal. For example, the wireless communication unit 220 receives a downlink signal from the base station and transmits an uplink signal to the base station.

In the present embodiment, the wireless communication unit 220 transmits an uplink signal directed to the base station 100 to the base station 100 or the relay terminal 300, and receives a downlink signal from the base station 100 to the base station 100 or the relay terminal 300.

(3) Storage Unit 230

The storage unit 230 temporarily or permanently stores programs and various kinds of data for operation of the remote terminal 200.

(4) Processing Unit 240

The processing unit 240 provides various functions of the remote terminal 200. The processing unit 240 includes a discovering unit 241, a determining unit 243 and a transmission processing unit 245. The discovering unit 241 performs processing for discovering the relay terminal 300. The determining unit 243 performs processing of determining which of the base station 100 and the relay terminal 300 is set as a transmission destination of a packet. The transmission processing unit 245 performs processing of transmitting a packet which is a determination target to a transmission destination in accordance with a determination result by the determining unit 243.

Note that the processing unit 240 can further include components other than these components. That is, the processing unit 240 can perform operation other than operation by these components. Each function of the discovering unit 241, the determining unit 243 and the transmission processing unit 245 will be described in detail later.

<1.3. Configuration Example of Relay Terminal>

Figure 3:
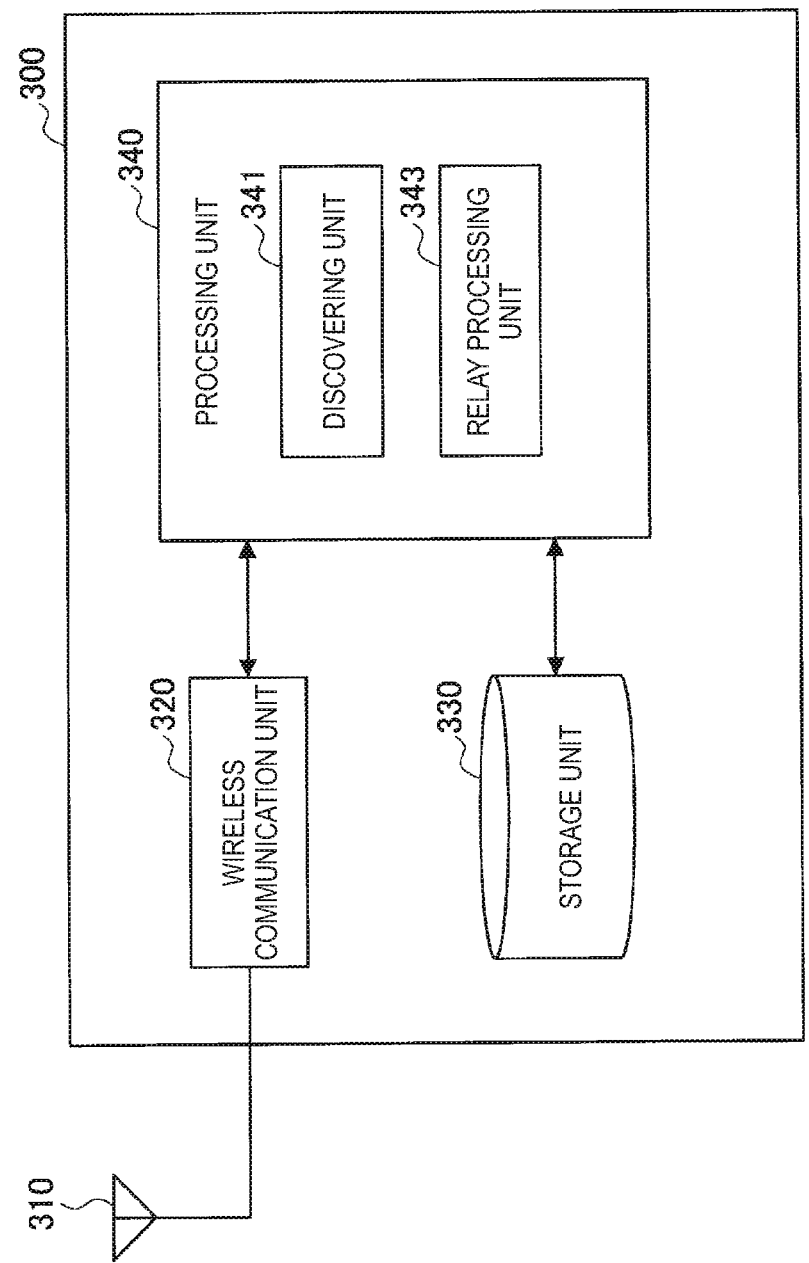
FIG. 3 is a block diagram illustrating an example of a configuration of a relay terminal according to the present embodiment.

FIG. 3 is a block diagram illustrating an example of a configuration of the relay terminal 300 according to the present embodiment. Referring to FIG. 3, the relay terminal 300 includes an antenna unit 310, a wireless communication unit 320, a storage unit 330 and a processing unit 340.

(1) Antenna Unit 310

The antenna unit 310 radiates a signal output from the wireless communication unit 320 to space as a radio wave. Further, the antenna unit 310 converts a radio wave in space into a signal and outputs the signal to the wireless communication unit 320.

(2) Wireless Communication Unit 320

The wireless communication unit 320 transmits/receives a signal. For example, the wireless communication unit 220 receives a downlink signal from the base station, and transmits an uplink signal to the base station.

In the present embodiment, the wireless communication unit 320 can receive an uplink signal directed to the base station 100 from the remote terminal 200 and transfer the uplink signal to the base station 100, and can receive a downlink signal directed to the remote terminal 200 from the base station 100 and transfer the downlink signal to the remote terminal 200.

(3) Storage Unit 330

The storage unit 330 temporarily or permanently stores programs and various kinds of data for operation of the relay terminal 300.

(4) Processing Unit 340

The processing unit 340 provides various functions of the relay terminal 300. The processing unit 340 includes a discovering unit 341 and a relay processing unit 343. The discovering unit 341 performs processing for discovering the remote terminal 200. The relay processing unit 343 performs processing of relaying a packet received from the remote terminal 200 to the base station 100.

Note that the processing unit 340 can further include components other than these components. That is, the processing unit 340 can perform operation other than operation by these components. Each function of the discovering unit 341 and the relay processing unit 343 will be described in detail later.

2. Processing Flow

Figure 4:
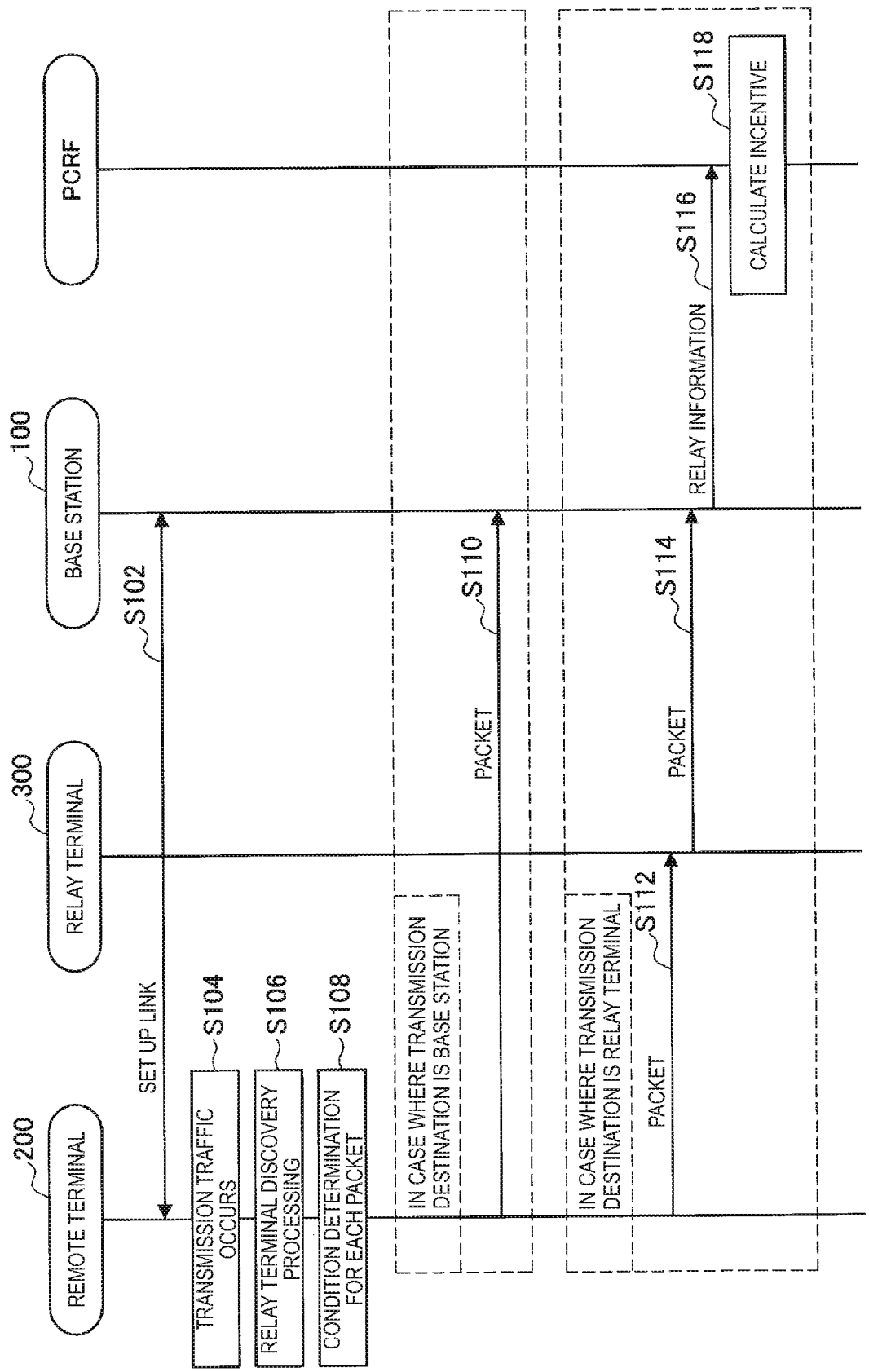
FIG. 4 is a sequence diagram illustrating an example of flow of uplink communication processing in the system according to the present embodiment.

Subsequently, an example of flow of uplink communication processing in the system 1 according to the present embodiment will be described with reference to FIG. 4. FIG. 4 is a sequence diagram illustrating an example of the flow of the uplink communication processing in the system 1 according to the present embodiment. The base station 100, the remote terminal 200, the relay terminal 300 and the PCRF are involved in the present sequence.

First, the remote terminal 200 and the base station 100 sets up a link (step S102). Then, in the case where transmission traffic (that is, data to be transmitted) occurs (step S104), the remote terminal 200 performs relay terminal discovery processing for discovering the relay terminal 300 (step S106). The remote terminal 200 then performs condition determination regarding transmission path switching conditions for each packet to be transmitted (step S108).

In the case where the remote terminal 200 determines the base station 100 as a transmission destination, the remote terminal 200 transmits a packet which is a determination target to the base station 100 (step S110).

Meanwhile, in the case where the remote terminal 200 determines the relay terminal 300 as a transmission destination, the remote terminal 200 sets up a link with the relay terminal 300 and transmits a packet which is a determination target to the relay terminal 300 (step S112). The relay terminal 300 then transfers the packet received from the remote terminal 200 to the base station 100 (step S114). Thereafter, the base station 100 transmits relay information which is information regarding relay of a packet performed by the relay terminal 300 to the PCRF (step S116). The PCRF then calculates an incentive to be provided to the relay terminal 300 on the basis of the received relay information (step S118).

3. Details of Each Processing

Details of each processing described above will be described below with reference to FIG. 4.

<3.1. Relay Terminal Discovery Processing>

In the relay terminal discovery processing, the remote terminal 200 (for example, the discovering unit 241) and the relay terminal 300 (for example, the discovering unit 341)

perform processing for discovering each other. In the following description, four types of discovery processing will be described as an example.

(1) First Method

In a first method, the relay terminal 300 transmits a first discovery signal (hereinafter, also simply referred to as a discovery signal), and the remote terminal 200 receives the first discovery signal.

Operation on Transmission Side of Discovery Signal

The relay terminal 300 (for example, the discovering unit 341) transmits a discovery signal for causing the remote terminal 200 to discover the relay terminal 300. By this means, the relay terminal 300 can notify the remote terminal 200 of existence of the relay terminal 300. This transmission of the discovery signal can be realized through discovery communication of a sidelink. The discovery communication here may be discovery communication of type 1 of 3GPP release 12, or discovery communication of type 2. Further, the discovery communication here may be discovery communication of either mode A or mode B.

Transmission Trigger

The relay terminal 300 may always (that is, periodically) transmit the discovery signal or may transmit the discovery signal at a predetermined timing. In terms of power consumption, it is desirable that the discovery signal is transmitted only in a predetermined period.

There can be a variety of triggers for transmitting the discovery signal. For example, the trigger for transmitting the discovery signal may be judged by the relay terminal 300 itself, or may be set on a network side (for example, the base station 100) or in an application layer. Further, the relay terminal 300 may transmit the discovery signal by being triggered by detection of a signal from the remote terminal 200.

Resources

The relay terminal 300 transmits the discovery signal in set predetermined resources. For example, the relay terminal 300 transmits the discovery signal using resources (frequency resources and/or time resources) selected from a resource pool set from the base station 100 or set at the terminal in advance. Use of the predetermined resources can facilitate monitoring of the discovery signal at the remote terminal 200.

Content of Discovery Signal

The discovery signal transmitted by the relay terminal 300 includes at least one piece of the following information.

identification information of the relay terminal 300
    buffer information of the relay terminal 300
    battery information of the relay terminal 300
    capability information (such as battery capacity, a buffer memory size, CPU processing performance, the number of remote terminals which can be accommodated, an RF configuration, and Full Duplex communication capability) of the relay terminal 300
    information indicating a level at which relay can be performed (such as communication quality and QoS)
    mobility information of the relay terminal 300
    location information of the relay terminal 300 (latitude information and longitude information indicating an existence location or zone information indicating an existence range)
    monitoring resource pool information of the relay terminal 300
(information regarding the resource pool to be used for transmission of the discovery signal)
    priority information of the relay terminal 300
    priority information of a packet of the relay terminal 300
    information of traffic to be handled by the relay terminal 300
    the number of lines and a line type which can be used by the relay terminal 300 to perform direct communication with the base station 100

Note that the number of lines which can be used to perform direct communication with the base station 100 means the number of backup lines and is information for grasping a possibility of connection to a network. For example, in the case where the relay terminal 300 has only one backup line, the remote terminal 200 judges the line as a vulnerable backup line and performs direct communication or preferentially performs relay communication via a relay terminal 300 other than the relay terminal 300. Further, examples of the line type can include a universal mobile telecommunications system (UMTS), evolved universal terrestrial radio access (E-UTRA), or the like.

Operation Mode

In the following description, an operation mode in which the relay terminal 300 transmits the discovery signal will be also referred to as a first operation mode, and an operation mode in which the relay terminal 300 does not transmit the discovery signal will be also referred to as a second operation mode.

For example, the base station 100 may transmit an activation notification of the discovery signal to the relay terminal 300. In this case, while the relay terminal 300 usually operates in the second operation mode, in the case where the relay terminal 300 receives the activation notification, the operation mode transitions to the first operation mode (that is, activation is performed), and the relay terminal 300 transmits the discovery signal. The activation notification includes transmission setting regarding the discovery signal, such as a transmission period and the number of times of transmission of the discovery signal. The activation notification can be transmitted using, for example, radio resource control (RRC) signaling or downlink control information (DCI). The activation may be performed in accordance with location information notified from the terminal side or information specific to the terminal (such as battery information, terminal capability information and information regarding a buffer at the terminal).

For example, the base station 100 may transmit information indicating an activation region which is a geographical range in which the relay terminal 300 should operate in the first operation mode to the relay terminal 300. The information indicating the activation region may be, for example, latitude and longitude information, information regarding a zone obtained by dividing geographical information into specific zones, or the like. Further, the activation region may be set for each frequency to be used for communication. In this case, in the case where the location information of the relay terminal 300 is included in the activation region, the relay terminal 300 operates in the first operation mode, and, otherwise, operates in the second operation mode. These kinds of operation may be performed for each frequency to be used. The information indicating the activation region can be transmitted using, for example, system information (that is, a master information block (MIB) (in other words, a physical broadcast channel (PBCH)), or a system information block (SIB)) or RRC signaling.

For example, the relay terminal 300 may transmit the discovery signal on the basis of received power of a signal from the remote terminal 200, for which the base station 100 is set as a transmission destination. Specifically, the relay terminal 300 performs sensing in an uplink transmission band of the remote terminal 200, and, in the case where the sensed power exceeds a predetermined threshold, operates in the first operation mode, and, otherwise, operates in the second operation mode. The relay terminal 300 may be notified of the information regarding the uplink transmission band in which sensing is performed from the base station 100. The base station 100 may make a notification of information regarding reading using a DCI region so that resource allocation information regarding uplink communication notified to the remote terminal 200 can be also read on the relay terminal 300 side. By this means, the relay terminal 300 can detect communication start at the remote terminal 200 without an explicit instruction or request from the base station 100 or the remote terminal 200 and can voluntarily provide relay communication. The setting information regarding the threshold of power and a band in which sensing is to be performed is provided, for example, from the base station 100 using RRC signaling.

Discovery Request

The relay terminal 300 notifies a network side (for example, the base station 100) of information regarding the discovery signal before transmitting the discovery signal. Such a notification will be also referred to as a discovery request. The discovery request can include, for example, identification information (UE identity or Capability) of the relay terminal 300, identification information of application, or the like. In the case where the network side receives the discovery request, the network side returns a discovery request response to the relay terminal 300 as a response. By the discovery request response, a timer indicating a period during which the relay terminal 300 can behave as the relay terminal 300, that is, a period during which the relay terminal 300 can relay communication of the remote terminal 200 may be set. Further, resource pool information for allowing the relay terminal 300 to operate as the relay terminal 300 may be provided.

Operation on Reception Side of Discovery Signal

The remote terminal 200 (for example, the discovering unit 241) discovers the relay terminal 300 by monitoring the discovery signal from the relay terminal 300 in the set predetermined resources. An example of specific monitoring processing will be described below.

Monitoring Processing Using Paging

In the monitoring processing using paging, the base station 100 transmits paging of the relay terminal 300 on behalf of the relay terminal 300, and the remote terminal 200 performs monitoring on the basis of the paging. More specifically, the remote terminal 200 monitors the discovery signal in a paging period (in other words, at a paging timing) set by the base station 100. This point will be described in detail with reference to FIG. 5.

Figure 5:
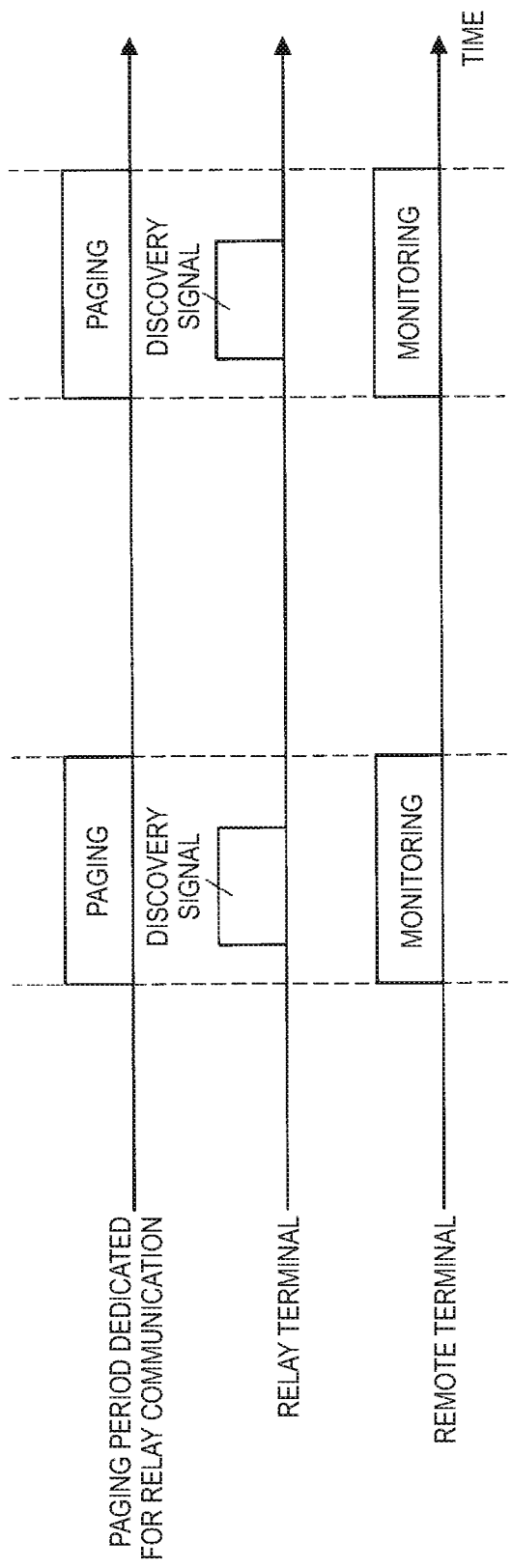
FIG. 5 is a diagram for explaining an example of relay terminal discovery processing according to the present embodiment.

FIG. 5 is a diagram for explaining an example of the relay terminal discovery processing according to the present embodiment. First, the base station 100 performs setting regarding paging dedicated for relay communication in addition to normal paging defined in the LTE. For example, the base station 100 sets the same paging period dedicated for relay communication at the remote terminal 200 and at the relay terminal 300. Then, as illustrated in FIG. 5, the relay terminal 300 transmits the discovery signal in the set paging period dedicated for relay communication, and the remote terminal 200 performs monitoring in the set paging period dedicated for relay communication. Because the same paging period dedicated for relay communication is set at each of the remote terminal 200 and the relay terminal 300, the remote terminal 200 can efficiently monitor the discovery signal from the relay terminal 300.

The base station 100 makes a notification of setting information regarding paging dedicated for relay communication using, for example, a paging channel and performs setting.

In the case where paging dedicated for relay communication is set, the relay terminal 300 transmits the discovery signal at least once or more times within one paging period dedicated for relay communication.

In the case where the paging period dedicated for relay communication is set, the remote terminal 200 monitors the signal from the relay terminal 300 during the set period and discovers the discovery signal.

Setting regarding the paging dedicated for relay communication to be performed by the base station 100 may relate to time resources or may relate to frequency resources as described above. For example, the base station 100 may set the same frequency band at the relay terminal 300 and the remote terminal 200 respectively as a frequency band in which the discovery signal is to be transmitted and as a frequency band in which monitoring is to be performed. Further, these frequency bands may be set in advance at the remote terminal 200 and at the relay terminal 300. In this case, the frequency band may be, for example, the same channel as the paging channel.

Monitoring Processing Using Resource Pool

In the monitoring processing using a resource pool, transmission and monitoring of the discovery signal is performed in a predetermined resource pool. The monitoring processing using a resource pool will be described below.

Setting information of the resource pool to be used for transmission of the discovery signal may be provided from the base station 100, or may be set in advance at the remote terminal 200 and the relay terminal 300. In the case where the setting information is provided from the base station 100, RRC signaling or system information can be used.

The setting information of the resource pool may be generated on the basis of location information and direction information of the relay terminal 300. In this case, the relay terminal 300 regularly reports the location information and the direction information of the relay terminal 300 to the base station 100, and the base station 100 generates the setting information of the resource pool on the basis of these kinds of information. Alternatively, the location information and mapping information of the resource pool may be provided from the base station 100. In this case, the relay terminal 300 sets the resource pool by itself by referring to the mapping information provided from the base station 100 using the location information of the relay terminal 300.

The base station 100 may transmit a monitoring request message to the remote terminal 200. The monitoring request message can include ID information such as a discovery filter ID which is identification information of the discovery signal to be filtered and a discovery ID which is identification information of the discovery signal to be received. The base station 100 may notify the remote terminal 200 and the relay terminal 300 of the ID information to be allocated to the relay terminal 300. The base station 100 may generate the ID information of the relay terminal 300 on the basis of identification information of the relay terminal 300 (for example, global unique temporary identity (GUTI) or temporary international mobile subscriber identity (TMSI)). Further, the base station 100 may allocate one piece of the ID information secured in advance as the ID information of the relay terminal 300.

The remote terminal 200 may perform monitoring on the whole of the allocated resource pool or may perform monitoring on part of the allocated resource pool. Monitoring on part of the resource pool will be also referred to as partial monitoring.

For example, in the case where partial monitoring is performed, the remote terminal 200 may perform monitoring on a resource pool for which a timer is being set (that is, resources in a predetermined period among the resource pool). Further, the remote terminal 200 may perform partial monitoring in accordance with the battery information, the buffer information or the location information of the remote terminal 200, or may perform setting of the partial monitoring by itself in accordance with the above-described parameter information or the setting may be made from the base station 100. In the case where the setting is made from the base station 100, the remote terminal 200 notifies the base station 100 of these kinds of information in advance. Note that the battery information can include remaining battery capacity, battery capacity, a battery consumption rate, or the like. Further, the buffer information can include a buffer size, remaining buffer capacity, or the like. Further, the base station 100 may give an instruction of performing partial monitoring or may set time resources to be monitored (hereinafter, also referred to as a partial monitoring window) or frequency resources. The partial monitoring will be described further in detail with reference to FIG. 6.

Figure 6:
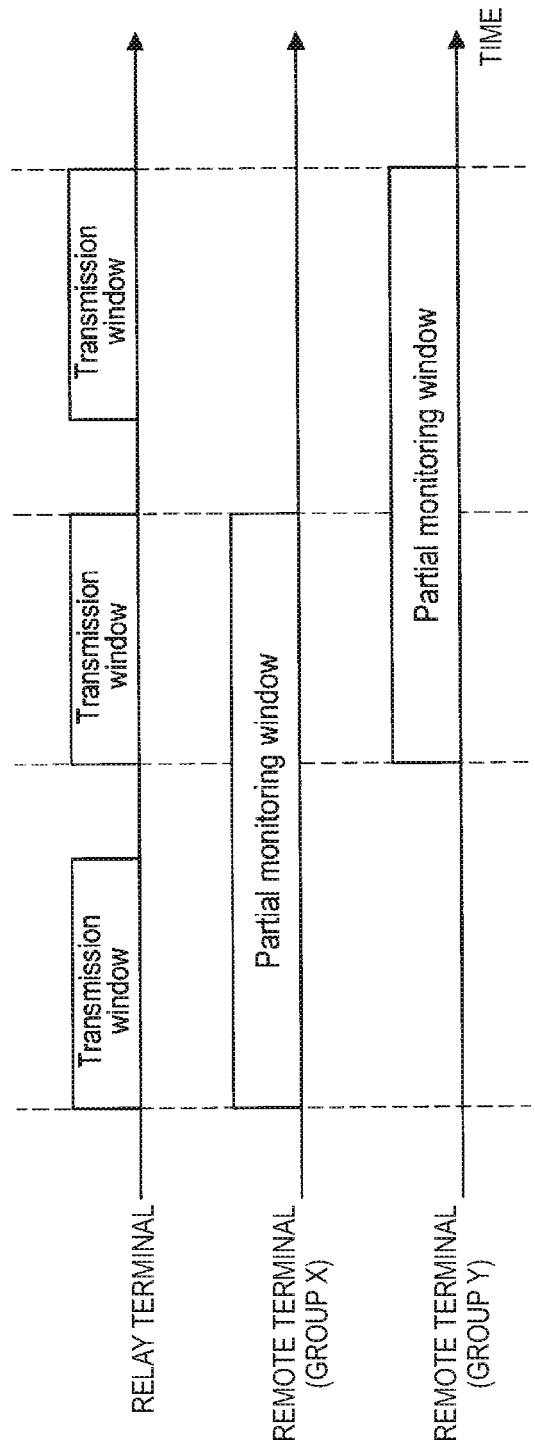
FIG. 6 is a diagram for explaining an example of the relay terminal discovery processing according to the present embodiment.

FIG. 6 is a diagram for explaining an example of the relay terminal discovery processing according to the present embodiment. As illustrated in FIG. 6, a transmission window may be set at the relay terminal 300. This setting can be performed by, for example, the base station 100. The relay terminal 300 transmits the discovery signal only within the transmission window. The remote terminal 200 then monitors the discovery signal in the partial monitoring window to discover the relay terminal 300. Further, as illustrated in FIG. 6, the partial monitoring window set at the remote terminal 200 and the transmission window set at the relay terminal 300 may have different lengths. Further, as illustrated in FIG. 6, different partial monitoring windows may be set at remote terminals 200 belonging to different groups. Note that groups of the remote terminals 200 can be set on the basis of location information of the remote terminal 200 or location estimation information using a received signal or terminal category information.

(2) Second Method

In a second method, the remote terminal 200 transmits a second discovery signal (hereinafter, also simply referred to as a discovery signal), and the relay terminal 300 receives the second discovery signal.

Operation on Transmission Side of Discovery Signal

The remote terminal 200 (for example, the discovering unit 241) transmits a discovery signal for causing the relay terminal 300 to discover the remote terminal 200 in set predetermined resources. This transmission of the discovery signal can be realized through discovery communication of a sidelink. The discovery communication here may be discovery communication of type 1 of 3GPP release 12 or may be discovery communication of type 2.

Transmission Trigger

The remote terminal 200 transmits the discovery signal at an arbitrary timing such as a timing at which transmission traffic occurs. In addition, the remote terminal 200 may use transmission triggers similar to those of the relay terminal 300 in the first method.

Resources

The remote terminal 200 transmits the discovery signal using resources (frequency resources and/or time resources) selected from a resource pool set from the base station 100 or set in advance.

The remote terminal 200 may transmit the discovery signal within a set timer period among the resource pool.

Relay Candidates

The remote terminal 200 may register (that is, store) candidate terminal apparatuses which can operate as the relay terminal 300 (processing of relaying communication of the remote terminal 200). For example, only terminal apparatuses allowed on the network side may be able to operate as the relay terminal 300. The remote terminal 200 registers identification information of the terminal apparatuses which can operate as the relay terminal 300.

The remote terminal 200 may transmit a compulsory relay request for causing the terminal apparatus which can operate as the relay terminal 300 to compulsorily operate as the relay terminal 300. In the case where the compulsory relay request is received from the remote terminal 200, the terminal apparatus which can operate as the relay terminal 300 compulsorily operates as the relay terminal 300. A notification of the compulsory relay request may be made from the base station 100. Further, the compulsory relay request may be transmitted to the base station 100 side. In the case where a signal is received on the base station 100 side, the base station 100 causes candidate relay terminals around the base station 100 to operate as the relay terminal 300 so that the remote terminal 200 which is a request source can perform relay communication. After activation of the relay terminal 300 is performed, the base station 100 provides resources for relay communication, ID information of the relay terminal, or the like, to the remote terminal 200 as an activation result notification.

Content of Discovery Signal

The discovery signal to be transmitted by the remote terminal 200 includes at least one or more pieces of the following information.

identification information of the remote terminal 200
    buffer information of the remote terminal 200
    battery information of the remote terminal 200
    capability information of the remote terminal 300 (such as
        battery capacity, a buffer memory size, CPU processing
        performance and an RF configuration)
    information indicating a relay request level
    (such as communication quality and QoS)
    mobility information of the remote terminal 200
    location information of the remote terminal 200
    (latitude information and longitude information indicating
        an existence location or zone information indicating an
        existence range)
    monitoring resource pool information of the remote terminal 200
    (information regarding the resource pool to be used for transmission of the discovery signal)
    priority information of the remote terminal 200
    priority information of a packet of the remote terminal 200
    information of traffic to be handled by the remote terminal 200
    the number of lines and a line type which can be used by
        the remote terminal 200 to perform direct communication with the base station 100

Note that the number of lines which can be used to perform direct communication with the base station 100 means the number of backup lines, and is information for grasping a possibility of connection to a network. For example, in the case where the remote terminal 200 has only one backup line, the relay terminal 300 judges that the line is a vulnerable backup line, and preferentially performs relay communication of the remote terminal 200. Further, examples of the line type can include a UMTS, E-UTRA, or the like.

Operation on Reception Side of Discovery Signal

The relay terminal 300 (for example, the discovering unit 341) determines whether or not to relay a signal from the remote terminal 200 to the base station 100 on the basis of the discovery signal transmitted from the remote terminal 200 in set predetermined resources. Specifically, the relay terminal 300 monitors the discovery signal from the remote terminal 200 to discover the remote terminal 200 on the basis of the discovery signal which has been successfully received.

Monitoring Processing

The relay terminal 300 can perform monitoring processing using paging or monitoring processing using the resource pool, described above concerning the first method.

Operation after Discovery Signal is Successfully Received

In the case where the relay terminal 300 successfully receives the discovery signal from the remote terminal 200 as a result of the monitoring processing, the relay terminal 300 judges whether or not to perform relay communication. In other words, in the case where the discovery signal is successfully received, the terminal apparatus which can operate as the relay terminal 300 determines whether or not to actually operate as the relay terminal 300.

For example, in the case where the number of discovered remote terminals 200 is equal to or larger than a threshold, the relay terminal 300 performs relay communication. This threshold may be provided from the base station 100, may be set by a user of the relay terminal 300, or may be set in advance. The threshold may be set in accordance with a traffic amount of the relay terminal. The relay terminal 300 may judge whether or not to perform relay communication on the basis of the battery information, moving speed, a moving direction, or the like, of the relay terminal 300, in addition to the number of the discovered remote terminals 200.

In the case where the relay terminal 300 discovers the remote terminal 200, the relay terminal 300 may notify the remote terminal 200 of information indicating that the remote terminal 200 has been discovered. By this means, the remote terminal 200 can discover the relay terminal 300 and can transition to relay communication.

(3) Third Method

In a third method, the remote terminal 200 discovers the relay terminal 300 on the basis of a synchronization signal transmitted from the relay terminal 300, an MIB (that is, a PBCH), an SIB, a sidelink synchronization signal (SLSS) or a physical sidelink broadcast channel (PSBCH).

The relay terminal 300 may transmit the synchronization signal, the MIB and the SIB in a similar manner to a small cell base station or may transmit the SLSS/PSBCH. Note that, if the synchronization is not necessary, transmission of the synchronization signal may be omitted.

The remote terminal 200 first detects the synchronization signal from the relay terminal 300. The relay terminal 300 transmits the synchronization signal using ID information allocated to the relay terminal 300 using a method similar to a method used by a typical base station to transmit the synchronization signal using a cell ID. By this means, the remote terminal 200 can discover the relay terminal 300.

The base station 100 may notify the remote terminal 200 and the relay terminal 300 of the ID information to be allocated to the relay terminal 300 in advance. The base station 100 may generate the ID information of the relay terminal 300 on the basis of the identification information (for example, the GUTI or the TMSI) of the relay terminal 300. Further, the base station 100 may allocate one piece of the ID information secured in advance as the ID information of the relay terminal 300.

In the case where synchronization is achieved between the remote terminal 200 and the relay terminal 300 by the synchronization signal from the base station 100, the synchronization signal from the relay terminal 300 may be omitted. In this case, the relay terminal 300 transmits the MIB and the SIB or the SLSS/PSBCH. Further, in this case, the relay terminal 300 includes at least the ID information allocated to the relay terminal 300 and information required for subsequent data transmission (for example, information indicating a transmission timing, or the like) in the MIB or the SIB or the SLSS/PSBCH.

(4) Fourth Method

In a fourth method, the base station 100 assists the remote terminal 200 to discover the relay terminal 300.

The remote terminal 200 (for example, the discovering unit 241) makes an inquiry to the base station 100 as to whether or not the relay terminal 300 exists in the neighborhood. The base station 100 provides a neighbor relay UE list indicating a list of the relay terminals 300 existing in the neighborhood of the remote terminal 200, to the remote terminal 200. The remote terminal 200 discovers relay terminals 300 in the neighborhood by referring to the provided neighbor relay UE list.

<3.2. Switching of Transmission Path>

The remote terminal 200 (for example, the determining unit 243) determines which of the base station 100 and the relay terminal 300 is set as a transmission destination for each packet in accordance with whether or not predetermined conditions are satisfied. The remote terminal 200 then switches or maintains a connection destination for each packet in accordance with a determination result. By this means, an optimal transmission destination is selected for each packet, so that it is possible to improve an effect of reducing power consumption.

There can be a variety of predetermined conditions. An example of the predetermined conditions will be described below. The remote terminal 200 may use arbitrary one of the predetermined conditions or combination of an arbitrary plurality of the predetermined conditions described below.

(1) Time

For example, the predetermined conditions may be conditions regarding time which has elapsed without the relay terminal 300 being discovered since transmission traffic occurred.

As background, because a use case can be assumed in IoT communication where regular communication or burst transmission is performed, occurrence of a time lag from occurrence of transmission traffic to actual transmission is allowed. The remote terminal 200 can perform relay terminal discovery processing during this allowed time lag after the transmission traffic has occurred. Meanwhile, the remote terminal 200 preferably satisfies latency requirements.

Therefore, the remote terminal 200 sets a predetermined threshold (that is, a timer) and selects a transmission destination in accordance with whether or not the relay terminal 300 is discovered before the timer expires since the transmission traffic has occurred. This point will be described in detail with reference to FIG. 7 and FIG. 8.

Figure 7:
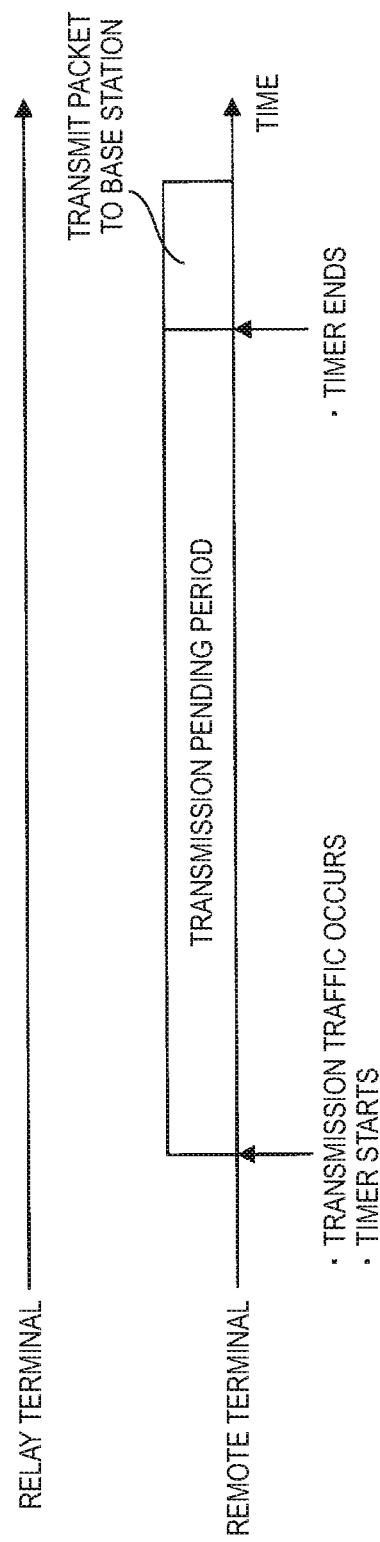
FIG. 7 is a diagram for explaining an example of transmission path switching processing according to the present embodiment.
Figure 8:
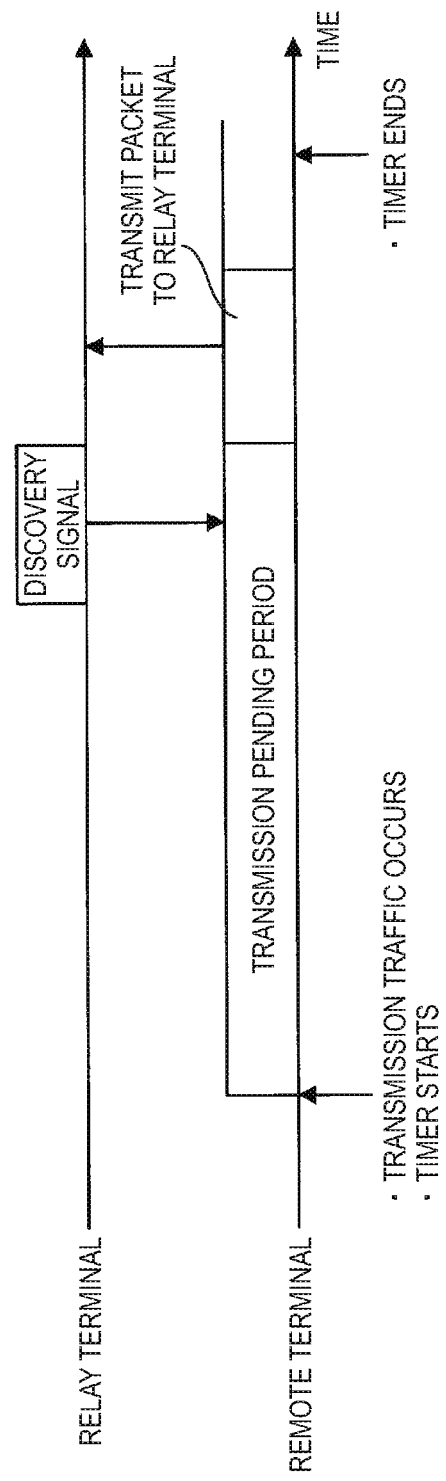
FIG. 8 is a diagram for explaining an example of the transmission path switching processing according to the present embodiment.

FIG. 7 and FIG. 8 are diagrams for explaining an example of the transmission path switching processing according to the present embodiment. As illustrated in FIG. 7 and FIG. 8, the remote terminal 200 starts the timer in the case where transmission traffic occurs. The remote terminal 200 then suspends transmission and performs the relay terminal discovery processing. Then, as illustrated in FIG. 7, the remote terminal 200 performs direct communication with the base station 100 in the case where the timer expires without the relay terminal 300 being discovered since the transmission traffic has occurred. Meanwhile, as illustrated in FIG. 8, in the case where the remote terminal 200 discovers the relay terminal 300 by, for example, receiving the discovery signal from the relay terminal 300, or the like, before the timer expires since the transmission traffic has occurred, the remote terminal 200 performs relay communication via the relay terminal 300.

The remote terminal 200 may perform the relay terminal discovery processing only during a timer set period. For example, in the case where the above-described first method is employed, the remote terminal 200 performs monitoring during the timer set period. Meanwhile, in the case where the above-described second method is employed, the remote terminal 200 transmits the discovery signal during the timer set period. Further, the remote terminal 200 may perform the relay terminal discovery processing also during a period other than the timer set period (for example, constantly).

On the basis of the above-described background, the timer is set at equal to or less than a maximum allowable delay period of a transmission packet.

The timer may be set using RRC signaling, or the like, from the base station 100, or may be set by the remote terminal 200 itself. Further, the timer may be set at the remote terminal 200 in advance.

The timer may be set at different values for each remote terminal 200, or may be set at different values for each group including a plurality of remote terminals 200. Further, the same timer may be set at remote terminals 200 connected to the same cell.

In the case where it is desirable to perform only relay communication via the relay terminal 300, the timer may be set at infinite.

Condition determination regarding the timer may be performed by the base station 100 as well as being performed by the remote terminal 200. In this case, the base station 100 makes a notification of start of the relay terminal discovery processing and makes a notification of stop in the case where the timer expires. Meanwhile, in the case where the remote terminal 200 is notified of start, the remote terminal 200 stops direct communication and performs the relay terminal discovery processing. The remote terminal 200 then performs relay communication in the case where the remote terminal 200 discovers the relay terminal 300 before the remote terminal 200 is notified of stop, and performs direct communication in the case where the remote terminal 200 is notified of stop without the relay terminal 300 being discovered.

(2) Remaining Capacity of Buffer

For example, the predetermined conditions may be conditions regarding the remaining capacity of the buffer in which transmission traffic is to be accumulated.

For example, the remote terminal 200 sets a predetermined threshold and selects a transmission destination in accordance with whether or not the remaining capacity of the buffer in which transmission traffic is to be accumulated exceeds the predetermined threshold. Specifically, the remote terminal 200 performs relay communication or performs the relay terminal discovery processing for relay communication while the remaining capacity of the buffer does not exceed the predetermined threshold. The remote terminal 200 then performs direct communication in the case where the remaining capacity of the buffer exceeds the predetermined threshold.

The predetermined threshold may be set using RRC signaling, or the like, from the base station 100 or may be set by the remote terminal 200 itself. Further, the predetermined threshold may be set at the remote terminal 200 in advance.

(3) Latency

For example, the predetermined conditions may be conditions regarding latency required for a packet.

For example, the remote terminal 200 performs direct communication regarding an urgent packet and performs relay communication regarding a non-urgent packet. Further, the remote terminal 200 may confirm to the base station 100 or the relay terminal 300 as to whether or not required latency can be satisfied with relay communication before direct communication is performed.

(4) QoS

For example, the predetermined conditions may be conditions regarding QoS required for a packet. Further, the predetermined conditions may be priority information of a packet.

For example, the remote terminal 200 performs direct communication regarding a packet for which high QoS is required and performs relay communication regarding a packet for which low QoS is required. Further, the remote terminal 200 may confirm to the base station 100 or the relay terminal 300 as to whether or not the required QoS can be satisfied with relay communication before direct communication is performed.

(5) Data Size

For example, the predetermined conditions may be conditions regarding a data size of a packet.

For example, the remote terminal 200 sets a predetermined threshold and selects a transmission destination in accordance with whether or not a data size of a packet to be transmitted exceeds the predetermined threshold. Specifically, the remote terminal 200 performs direct communication in the case where the data size of the packet exceeds the predetermined threshold, and performs relay communication in the case where the data size does not exceed the predetermined threshold. In this case, load applied on the relay terminal 300 can be reduced. Alternatively, the remote terminal 200 performs relay communication in the case where the data size of the packet exceeds the predetermined threshold, and performs direct communication in the case where the data size does not exceed the predetermined threshold. In this case, an effect of reducing power consumption of the remote terminal 200 can be improved.

The predetermined threshold may be set using RRC signaling, or the like, from the base station 100 or may be set by the remote terminal 200 itself. Further, the predetermined threshold may be set at the remote terminal 200 in advance. Further, the predetermined threshold may be dynamically set.

(6) Geographical Relationship

For example, the predetermined conditions may be conditions regarding geographical relationship between the remote terminal 200 and the relay terminal 300.

For example, the remote terminal 200 performs relay communication in the case where the relay terminal 300 exists geographically close to the remote terminal 200, and performs direct communication in the case where the relay terminal 300 does not exist geographically close to the remote terminal 200. By this means, the remote terminal 200 can perform relay communication with less transmission power, so that an effect of reducing power consumption is improved.

The base station 100 may notify the remote terminal 200 of whether or not the relay terminal 300 exists geographically close to the remote terminal 200. Further, the base station 100 may notify the remote terminal 200 of location information of the relay terminal 300. In this case, the remote terminal 200 judges whether or not the relay terminal 300 exists geographically close to the remote terminal 200 by comparing the location information of the relay terminal 300 notified from the base station 100 with location information of the remote terminal 200. Further, the base station 100 may make a notification of information indicating whether or not the relay terminal 300 exists for each predetermined area. In this case, the remote terminal 200 judges whether or not the relay terminal 300 exists geographically close to the remote terminal 200 by referring to information of an area to which the remote terminal 200 belongs. Further, information of a zone in which each terminal is located may be used for exchange of geographical information.

(7) State of Relay Terminal 300

For example, the predetermined conditions may be conditions regarding a state of the relay terminal 300.

For example, in the case where the terminal apparatus which can operate as the relay terminal 300 is in a state where it is difficult to operate as the relay terminal 300, the terminal apparatus notifies (for example, broadcasts) the remote terminal 200 of a relay communication impossible notification indicating that it is difficult to operate as the relay terminal 300. Examples of the state where it is difficult to operate as the relay terminal 300 can include, for example, a state where remaining battery capacity is low, a state where relay communication has already been provided to another remote terminal 200, a state where quality of a backhaul link line cannot be secured, or the like. The remote terminal 200 selects a transmission destination on the basis of this notification. For example, in the case where the remote terminal 200 is notified of a relay communication impossible notification from the relay terminal 300 which is a relay communication partner, the remote terminal 200 switches communication to direct communication. The relay communication impossible notification may be made from the base station 100.

(8) State of Communication Path

For example, the predetermined conditions may be conditions regarding a state of a communication path between the remote terminal 200 and the relay terminal 300, that is, a state of sidelink.

For example, the remote terminal 200 sets a threshold regarding the state of the sidelink, for example, a predetermined threshold regarding a congestion degree, and selects a transmission destination in accordance with whether or not the congestion degree of the sidelink exceeds the predetermined threshold. Specifically, the remote terminal 200 performs direct communication in the case where the congestion degree of the sidelink exceeds the predetermined threshold, and performs relay communication in the case where the congestion degree does not exceed the predetermined threshold. By this means, excessive congestion of the sidelink is prevented. Congestion information may be provided from the base station 100, or may be calculated by the terminal itself through sensing. A sensing region may be set from the base station 100, or a parameter set in advance may be used.

The predetermined threshold may be set using RRC signaling, or the like, from the base station 100 or may be set by the remote terminal 200 itself. Further, the predetermined threshold may be at the remote terminal 200 in advance. Further, the predetermined threshold may be dynamically set.

As the state of the sidelink, in place of the congestion degree, a result of sensing performed by the remote terminal 200 or the relay terminal 300 may be used.

<3.3. Relay Communication>

The remote terminal 200 (for example, the transmission processing unit 245) transmits a packet which is a determination target to the determined transmission destination in accordance with a determination result of the transmission destination (that is, the transmission path) for each of the above-described packet. Therefore, the remote terminal 200 can perform transmission while switching communication between direct communication and relay communication for each packet. Among them, relay communication will be described in detail below.

The relay terminal 300 (relay processing unit 343) receives a packet from the remote terminal 200 and relays (that is, transmits) the packet to the base station 100. Transmission of data in relay communication may be implemented with communication in mode 1 or communication in mode 2 of the sidelink. Transmission of data in direct communication may be implemented with uplink communication.

In the case where the remote terminal 200 discovers the relay terminal 300, the remote terminal 200 performs attachment processing on the relay terminal 300. By this means, the remote terminal 200 is registered as a terminal apparatus which is connected to the relay terminal 300. Then, the remote terminal 200 performs relay communication via the relay terminal 300.

The relay terminal 300 ceases operation as the relay terminal 300 or relays communication of the remote terminal 200 until degradation in communication quality is discovered. In the case where the relay terminal 300 ceases operation as the relay terminal 300, the relay terminal 300 may transmit a release message indicating that the relay terminal 300 ceases operation as the relay terminal 300 to the remote terminal 200. The remote terminal 200 which receives the release message newly searches for the relay terminal 300 or performs handover to the base station 100 which is an original serving base station.

A transmission timing of the remote terminal 200 and a reception timing of the relay terminal 300 in relay communication may be designated from the base station 100 or may be set in advance. Further, in a similar manner to the first method, a transmission period and a monitoring period may be restricted.

<3.3.1. Bearer>

A bearer to be used for relay communication will be described below.

(1) Reuse of bearer of remote terminal 200

It is assumed that connection between the remote terminal 200 and the base station 100 is established in advance. In relay communication, a bearer of the remote terminal 200 which is established in advance may be reused. In this case, the remote terminal 200 notifies the base station 100 of a wireless bearer release request to temporarily release a wireless bearer with the base station 100. Note that the remote terminal 200 may make a notification of the wireless bearer release request through direct communication or through relay communication. The remote terminal 200 then notifies the relay terminal 300 of information for bearer reconfiguration.

The remote terminal 200 notifies the relay terminal 300 of identification information of the remote terminal 200 so as to enable the relay terminal 300 to set a bearer on behalf of the remote terminal 200. The relay terminal 300 sets a bearer on behalf of the remote terminal 200, that is, while posing as the remote terminal 200, using the notified identification information. Further, the remote terminal 200 may notify the base station 100 of information indicating that the remote terminal 200 notifies the relay terminal 300 of the identification information. This identification information may be, for example, temporal identification information, and, specifically, may be the GUTI or the TMSI.

The remote terminal 200 transmits a service request by way of the relay terminal 300, and the relay terminal 300 performs a bearer setting request using the service request received from the remote terminal 200.

Flow of a series of processing relating to reuse of the bearer of the remote terminal 200 described above will be described with reference to FIG. 9.

Figure 9:
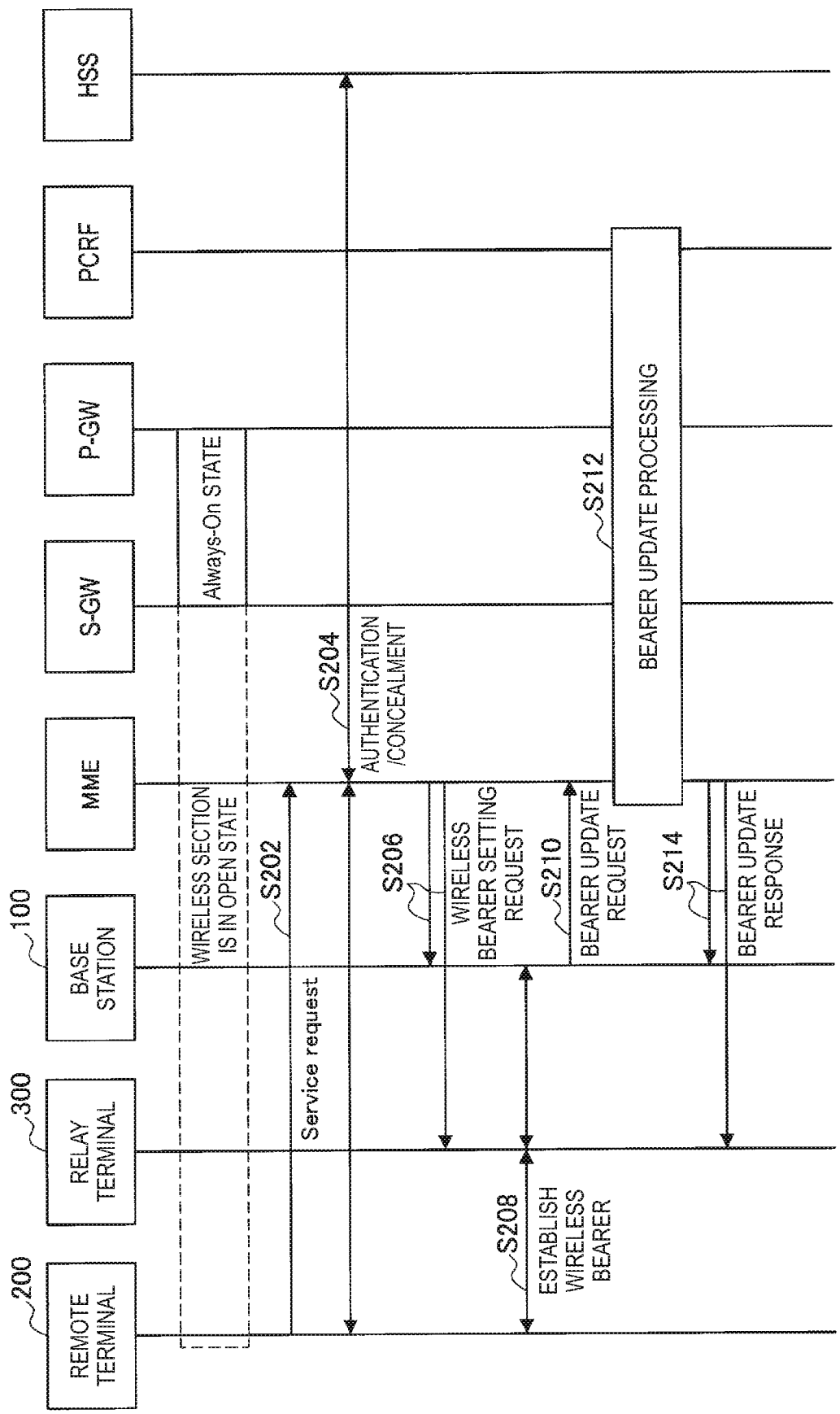
[FIG. 9]

FIG. 9 is a sequence illustrating an example of flow of bearer reuse processing to be executed in the system 1 according to the present embodiment. The remote terminal 200, the relay terminal 300, the base station 100, the MME, the S-GW, the P-GW, the PCRF and the HSS are involved in the present sequence.

As illustrated in FIG. 9, it is assumed that, as an initial state, a wireless section is in an open state, and the S-GW and the P-GW are always connected (always on). Further, it is assumed that communication between the remote terminal 200 and another apparatus is relayed by the relay terminal 300.

First, the remote terminal 200 transmits a service request to the MME (step S202). Then, the remote terminal 200 performs authentication processing and concealing processing between the remote terminal 200 and the MME (step S204). Note that the MME exchanges messages for the authentication processing and the concealing processing with the HSS. Then, the MME transmits a wireless bearer setting request to the base station 100 and the relay terminal 300 (step S206). The relay terminal 300 then establishes a wireless bearer with the remote terminal 200 and with the base station 100 (step S208). The base station 100 then transmits a bearer update request to the MME (step S210). The MME then performs bearer update processing between the MME and the S-GW, P-GW and PCRF (step S212). Thereafter, the MME transmits a bearer update response to the base station 100 and the relay terminal 300 (step S214).

(2) Diversion of bearer of relay terminal 300

It is assumed that connection between the relay terminal 300 and the base station 100 is established in advance. The relay terminal 300 may divert a bearer of the relay terminal 300 to transmit data from the remote terminal 200. In this case, the relay terminal 300 transmits an IP session (that is, a packet) from the remote terminal 200 using the bearer of the relay terminal 300. The relay terminal 300 may buffer the packet received from the remote terminal 200. The relay terminal 300 then transmits the buffered packet from the remote terminal 200 to a network side (that is, the base station 100) using the bearer of the relay terminal 300 after buffering for a predetermined period.

The relay terminal 300 also transmits a packet of the relay terminal 300 to the base station 100 using the bearer of the relay terminal 300. Therefore, the remote terminal 200 and the relay terminal 300 respectively store information indicating transmission sources (for example, identification information of the remote terminal 200 and the relay terminal 300) in the packets of the remote terminal 200 and the relay terminal 300. By this means, the base station 100 can determine whether the transmission source of the packet received from the relay terminal 300 is the remote terminal 200 or the relay terminal 300.

(3) Setting of Dedicated Bearer

The relay terminal 300 may set a dedicated bearer for transmitting a packet from the remote terminal 200. The relay terminal 300 may establish a bearer in accordance with application (or in accordance with the remote terminal 200) separately from the bearer of the relay terminal 300 and may accommodate the bearer of the remote terminal 200 in this bearer. Also in this case, the remote terminal 200 and the relay terminal 300 can enable the base station 100 to determine the transmission source by respectively storing information indicating transmission sources in the packets of the remote terminal 200 and the relay terminal 300.

The relay terminal 300 may establish a bearer for each remote terminal 200 or may establish a bearer for each group to which the remote terminal 200 belongs after operation as the relay terminal 300 is started.

<3.3.2. Burst Transmission>

In relay communication, burst transmission may be performed in which transmission data is transmitted after a predetermined amount of transmission data is buffered or transmission data is buffered for a predetermined period. For example, in the case where the latency requirements are relatively sufficiently satisfied, the relay terminal 300 can perform burst transmission to the base station 100.

Setting of the burst transmission will be described below. A trigger for executing the burst transmission can be set using one of the methods described below as an example or combination of a plurality of methods. Note that processing of executing the burst transmission in the following description is processing of collectively transmitting data from the relay terminal 300 which has been buffered until then.

(1) Trigger Based on Time

The trigger for executing burst transmission may relate to time.

For example, the relay terminal 300 may execute burst transmission with a set period. It is desirable that an execution interval of the burst transmission is assumed to be equal to or less than a maximum delay amount. Concerning this point, the relay terminal 300 notifies the base station 100 of information of maximum delay requirements upon RRC connection setup. Therefore, the base station 100 sets an execution interval (that is, a period) of the burst transmission at equal to or less than the maximum delay amount. A notification of this setting information can be made, for example, through RRC signaling.

For example, the relay terminal 300 may execute burst transmission in a set period. For example, a network side is relatively vacant in a midnight period. Therefore, a trigger may be set such that a midnight period is a period during which burst transmission should be executed.

(2) Trigger Based on Remaining Buffer Amount

A trigger for executing burst transmission may relate to a buffer remaining amount (that is, remaining capacity of the buffer) of the relay terminal 300. For example, the relay terminal 300 compares a buffer size of the relay terminal 300 with a size of data which received from the remote terminal 200 and buffered and, in the case where the remaining buffer amount becomes equal to or less than a threshold, executes burst transmission. Note that a notification of the threshold may be made from the network side (for example, the base station 100), or the threshold may be set at the relay terminal 300 in advance.

(3) Trigger Based on Channel State

The trigger for executing burst transmission may relate to a channel state between the relay terminal 300 and the base station 100. For example, the relay terminal 300 performs channel state information (CSI) measurement, and executes burst transmission in the case where the measured channel state is equal to or greater than a threshold. As the channel state, for example, reference signal received power (RSRP) or reference signal received quality (RSRQ) may be used. Note that a notification of the threshold may be made from the network side (for example, the base station 100), or the threshold may be set at the relay terminal 300 in advance.

(4) Trigger Based on Speed Information or Location Information

The trigger for executing burst transmission may relate to speed information or location information of the relay terminal 300. For example, the relay terminal 300 executes burst transmission in the case where the speed information is equal to or greater than a threshold or in the case where a location indicated by the location information is included in a predetermined region. Note that a notification of the threshold or the predetermined region may be made from the network side (for example, the base station 100), or the threshold or the predetermined region may be set at the relay terminal 300 in advance.

(5) Trigger Based on Other Radio Access Technologies (RATs)

The trigger for executing burst transmission may relate to other RATs. For example, the relay terminal 300 performs burst transmission using another RAT in the case where the relay terminal 300 is connected to the other RAT. The other RAT here is an RAT in which offloading is possible, such as, for example, a wireless local area network (LAN) and Bluetooth (registered trademark).

<3.4. Incentive Calculation>

An incentive may be provided to the relay terminal 300 which performs relay communication, because the relay terminal 300 relays a packet for an operator using processor power and a battery of the relay terminal 300.

For example, the PCRF can calculate an incentive in accordance with an amount of data relayed by the relay terminal 300. Specifically, the PCRF specifies a packet relayed on the basis of the relay information acquired from the base station 100 and calculates an incentive in accordance with an amount of such a packet. The relay information includes, for example; a transmission source IP address, a destination IP address, a port number, or the like.

The incentive may be calculated in units of bearers of the relay terminal 300. For example, the incentive may be calculated on the basis of a product of the number of bearers of the relay terminal 300 and the number of sessions. Further, the incentive may be calculated in units of bearers dedicated for the remote terminal 200 set at the relay terminal 300.

The incentive can be realized in various forms. For example, the incentive may be given back to a user of the relay terminal 300 as a point or cash, or may be given back as increase in an upper limit of a possible communication amount, or the like. Further, the incentive may be given back as right to participate in a game, or the like, which is available in exchange for points. Further, the incentive may be given back as a monthly status rank provided to the user. In this manner, the incentive in the PCRF may be provided in coordination with application.

4. Application Examples

The technology of the present disclosure can be applied to various products. For example, the remote terminal 200 or the relay terminal 300 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the remote terminal 200 or the relay terminal 300 may be realized as a terminal that performs machine-to-machine (M2M) communication (also referred to as a machine type communication (MTC) terminal). Furthermore, the remote terminal 200 or the relay terminal 300 may be a wireless communication module mounted in such a terminal (for example, an integrated circuit module configured in one die).

First Application Example

Figure 10:
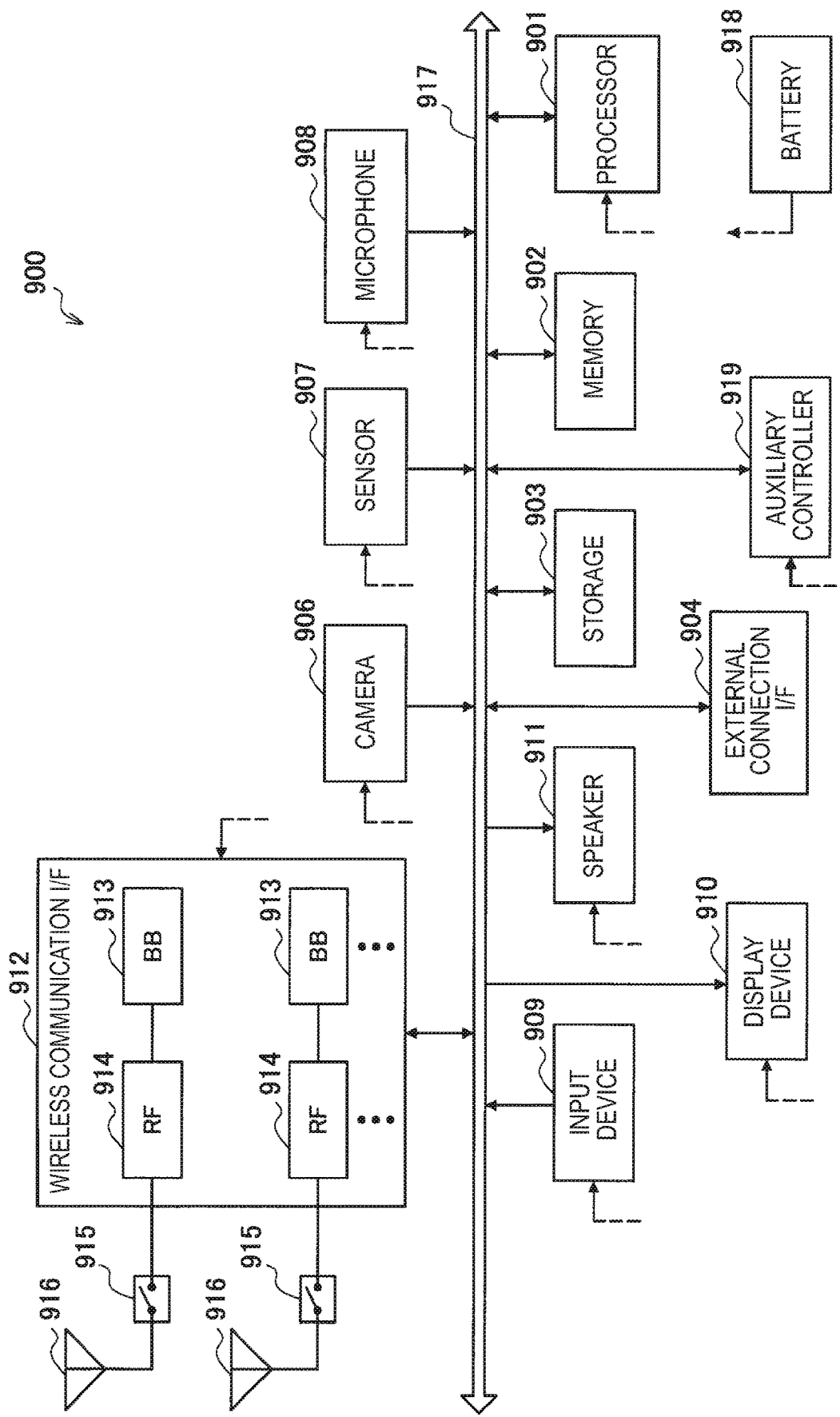
FIG. 10 is a block diagram illustrating an example of a schematic configuration of a smartphone.

FIG. 10 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916.

The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 10. Although FIG. 10 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 10. Although FIG. 10 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 10 via feeder lines, which are partially shown as dashed lines in the figure. The auxiliary controller 919 operates a minimum necessary function of the smartphone 900, for example, in a sleep mode.

In the smartphone 900 shown in FIG. 10, one or more constituent elements (the discovering unit 241, the determining unit 243 and/or the transmission processing unit 245) included in the processing unit 240 described with reference to FIG. 2 or one or more constituent elements (the discovering unit 341 and/or the relay processing unit 343) included in the processing unit 340 described with reference to FIG. 3 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the above-described one or more constituent elements may be implemented by the module. In this case, the module may store a program for causing the processor to function as the above-described one or more constituent elements (i.e., a program for causing the processor to execute operations of the above-described one or more constituent elements) and may execute the program. As another example, the program for causing the processor to function as the above-described one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the above-described one or more constituent elements may be provided. In addition, a readable recording medium in which the program is recorded may be provided.

Further, in the smartphone 900 illustrated in FIG. 10, for example, the wireless communication unit 220 described with reference to FIG. 2 or the wireless communication unit 320 described with reference to FIG. 3 may be implemented at a wireless communication interface 912 (for example, the RF circuit 914). Further, the antenna unit 210 described with reference to FIG. 2 or the antenna unit 310 described with reference to FIG. 3 may be implemented at the antenna 916. Further, the storage unit 230 described with reference to FIG. 2 or the storage unit 330 described with reference to FIG. 3 may be implemented at the memory 902.

Second Application Example

FIG. 11 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 11. Although FIG. 11 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 11. Although FIG. 11 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 11 via feeder lines that are partially shown as dashed lines in the figure. The battery 938 accumulates power supplied from the vehicle.

In the car navigation device 920 shown in FIG. 11, one or more constituent elements (the discovering unit 241, the determining unit 243 and/or the transmission processing unit 245) included in the processing unit 240 described with reference to FIG. 2 or one or more constituent elements (the discovering unit 341 and/or the relay processing unit 343) included in the processing unit 340 described with reference to FIG. 3 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the above-described one or more constituent elements may be installed in the car navigation device 920, and the wireless communication interface 933 (for example, the BB processor 934) and/or the processor 921 may execute the program. As described above, the car navigation device 920 or the module may be provided as a device which includes the above-described one or more constituent elements, and the program for causing the processor to function as the above-described one or more constituent elements may be provided. In addition, a readable recording medium in which the program is recorded may be provided.

Further, at the car navigation apparatus 920 illustrated in FIG. 11, for example, the wireless communication unit 220 described with reference to FIG. 2 or the wireless communication unit 320 described with reference to FIG. 3 may be implemented at the wireless communication interface 933 (for example, the RF circuit 935). Further, the antenna unit 210 described with reference to FIG. 2 or the antenna unit 310 described with reference to FIG. 3 may be implemented at the antenna 937. Further, the storage unit 230 described with reference to FIG. 2 or the storage unit 330 described with reference to FIG. 3 may be implemented at the memory 922.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

5. Conclusion

An embodiment of the present disclosure has been described in detail above with reference to FIG. 1 to FIG. 11. As described above, the remote terminal 200 according to the present embodiment determines which of the base station 100 and the relay terminal 300 is set as a transmission destination for each packet in accordance with whether or not predetermined conditions are satisfied. In this manner, the remote terminal 200 can select a communication path in a packet unit, so that flexibility of selection is improved. Further, the relay terminal 300 relays the packet received from the remote terminal 200 to the base station 100 as a result of such determination. By this means, the relay terminal 300 can perform traffic offloading in a packet unit.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above description, direct communication and relay communication relating to transmission of an uplink signal from the relay terminal 300 has been particularly described, the present technology is not limited to such an example. For example, the present technology can be also applied to direct communication and relay communication relating to a downlink signal directed to the relay terminal 300. For example, the base station 100 may determine which of the relay terminal 300 and the remote terminal 200 is set as a transmission destination of a downlink signal directed to the relay terminal 300 for each packet in accordance with whether or not predetermined conditions are satisfied. Note that, because the relay terminal 300 has already been connected to the base station 100, the relay terminal discovery processing may be omitted.

Further, the processing described using the sequence diagram in the present specification does not necessarily have to be executed in illustrated order. Some processing steps may be executed in parallel. Further, additional processing steps may be employed, and part of processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A terminal apparatus including:

a processing unit configured to determine which of a base station or a relay terminal is set as a transmission destination for each packet in accordance with whether or not a predetermined condition is satisfied.

(2)

The terminal apparatus according to (1), in which the predetermined condition relates to time elapsed without the relay terminal being discovered since transmission traffic has occurred.

(3)

The terminal apparatus according to (1) or (2), in which the predetermined condition relates to remaining capacity of a buffer in which transmission traffic is to be accumulated.

(4)

The terminal apparatus according to any one of (1) to (3), in which the predetermined condition relates to latency required for the packet.

(5)

The terminal apparatus according to any one of (1) to (4), in which the predetermined condition relates to quality of service (QoS) required for the packet.

(6)

The terminal apparatus according to any one of (1) to (5), in which the predetermined condition relates to a data size of the packet.

(7)

The terminal apparatus according to any one of (1) to (6), in which the predetermined condition relates to geographical relationship with the relay terminal.

(8)

The terminal apparatus according to any one of (1) to (7), in which the predetermined condition relates to a state of the relay terminal.

(9)

The terminal apparatus according to any one of (1) to (8), in which the predetermined condition relates to a state of a communication path to the relay terminal.

(10)

The terminal apparatus according to any one of (1) to (9), in which the processing unit discovers the relay terminal by monitoring a first discovery signal from the relay terminal in a set predetermined resource.

(11)

The terminal apparatus according to (10), in which the processing unit monitors the first discovery signal in a paging period set by the base station.

(12)

The terminal apparatus according to any one of (1) to (9), in which the processing unit transmits a second discovery signal for causing the relay terminal to discover the terminal apparatus in a set predetermined resource.

(13)

A terminal apparatus including:

a processing unit configured to relay to the base station a packet received from another terminal apparatus which determines which of a base station or the terminal apparatus is set as a transmission destination for each packet in accordance with whether or not a predetermined condition is satisfied.

(14)

The terminal apparatus according to (13), in which the processing unit transmits a first discovery signal for causing the terminal apparatus to be discovered in a set predetermined resource.

(15)

The terminal apparatus according to (14), in which the processing unit transmits the first discovery signal on the basis of received power of a signal from the other terminal apparatus, for which the base station is set as a transmission destination.

(16)

The terminal apparatus according to (13), in which the processing unit determines whether or not to relay the signal from the other terminal apparatus to the base station on the basis of a second discovery signal transmitted from the other terminal apparatus in a set predetermined resource.

(17)

A method to be executed by a processor, the method including:

determining which of a base station or a relay terminal is set as a transmission destination for each packet in accordance with whether or not a predetermined condition is satisfied.

(18)

A method to be executed by a terminal apparatus, the method including:

relaying to the base station a packet received from another terminal apparatus which determines which of a base station or the terminal apparatus is set as a transmission destination for each packet in accordance with whether or not a predetermined condition is satisfied.

(19)

A recording medium having a program recorded thereon, the program causing a computer to function as a processing unit configured to determine which of a base station or a relay terminal is set as a transmission destination for each packet in accordance with whether or not a predetermined condition is satisfied.

(20)

A recording medium having a program recorded thereon, the program causing a computer which controls a terminal apparatus to function as a processing unit configured to cause a packet received by the terminal apparatus from another terminal apparatus which determines which of a base station or the terminal apparatus is set as a transmission destination for each packet in accordance with whether or not a predetermined condition is satisfied, to be relayed to the base station by the terminal apparatus.

REFERENCE SIGNS LIST 1 system
11 cell
20 core network
30 PDN
100 base station
200 terminal apparatus, remote terminal
210 antenna unit
220 wireless communication unit
230 storage unit
240 processing unit
241 discovering unit
243 determining unit
245 transmission processing unit
300 terminal apparatus, relay terminal
310 antenna unit
320 wireless communication unit
330 storage unit
340 processing unit
341 discovering unit
343 relay processing unit

The invention claimed is:

1. A terminal apparatus, comprising:
a processor configured to:
set, in a timer, a time period that is equal to or less than a maximum allowable delay period of a packet;
start the timer based on an occurrence of a transmission traffic;
suspend transmission of the packet to a base station, wherein the suspended transmission is based on the start of the timer;
control transmission of a signal to a relay terminal based on the suspended transmission of the packet;
control reception of a first discovery signal from the relay terminal based on a power of the transmitted signal, wherein
the transmitted signal causes the relay terminal to operate in a specific operation mode based on the power of the transmitted signal higher than a threshold, and
the relay terminal transmits the first discovery signal in the specific operation mode;
determine the relay terminal is set as a transmission destination for the packet, wherein
the determination is based on a specific condition that is satisfied, and the reception of the first discovery signal from the relay terminal, and
the specific condition corresponds to an elapse of the time period within which the relay terminal is one of discovered or undiscovered based on the first discovery signal, since the occurrence of the transmission traffic; and
control transmission of the packet to the transmission destination.

2. The terminal apparatus according to claim 1, wherein the specific condition relates to a remaining capacity of a buffer in which the transmission traffic is to be accumulated.

3. The terminal apparatus according to claim 1, wherein the specific condition relates to latency required for the packet.

4. The terminal apparatus according to claim 1, wherein the specific condition relates to a quality of service (QoS) required for the packet.

5. The terminal apparatus according to claim 1, wherein the specific condition relates to a data size of the packet.

6. The terminal apparatus according to claim 1, wherein the specific condition relates to a geographical relationship of the terminal apparatus with the relay terminal.

7. The terminal apparatus according to claim 1, wherein the specific condition relates to a state of the relay terminal.

8. The terminal apparatus according to claim 1, wherein the specific condition relates to a state of a communication path between the terminal apparatus and the relay terminal.

9. The terminal apparatus according to claim 1, wherein the processor is further configured to:
monitor the first discovery signal from the relay terminal in a set specific resource; and
discover the relay terminal based on the monitored first discovery signal.

10. The terminal apparatus according to claim 9, wherein the processor is further configured to monitor the first discovery signal in a paging period set by the base station.

11. The terminal apparatus according to claim 1, wherein the processor is further configured to transmit a second discovery signal to cause the relay terminal to discover the terminal apparatus in a set specific resource.

12. A first terminal apparatus, comprising:
a processor configured to:
transmit a discovery request to a base station, wherein the discovery request includes identification information of the first terminal apparatus;
receive a discovery request response based on the transmitted discovery request;
receive a first signal from a second terminal apparatus;
transmit a first discovery signal to the second terminal apparatus, wherein the transmission of the first discovery signal is based on a power of the received first signal and the transmitted discovery request;
set a first time period based on the received discovery request response, wherein
in the set first time period, the processor is further configured to:
receive a packet from the second terminal apparatus; and
relay the packet to the base station,
the second terminal apparatus:
sets a second time period that is equal to or less than a maximum allowable delay period of the packet, and
determines which one of the base station or the first terminal apparatus is set as a transmission destination for the packet,
the determination is based on a specific condition that is satisfied, and the transmitted first discovery signal to the second terminal apparatus, and
the specific condition corresponds to an elapse of the second time period within which the first terminal apparatus is one of discovered or undiscovered based on the first discovery signal, since an occurrence of a transmission traffic.

13. The first terminal apparatus according to claim 12, wherein the first discovery signal causes the second terminal apparatus to discover the first terminal apparatus in a set specific resource.

14. The first terminal apparatus according to claim 12, wherein the processor is further configured to:
receive a second discovery signal from the second terminal apparatus in a set specific resource; and
determine relay of a second signal from the second terminal apparatus to the base station based on the second discovery signal.

15. A method, comprising:
in a terminal apparatus:
- setting, in a timer, a time period that is equal to or less than a maximum allowable delay period of a packet;
- starting the timer based on an occurrence of a transmission traffic;
- suspending transmission of the packet to a base station, wherein the suspended transmission is based on the start of the timer;
- controlling transmission of a signal to a relay terminal based on the suspended transmission of the packet;
- controlling reception of a discovery signal from the relay terminal based on a power of the transmitted signal, wherein
  - the transmitted signal causes the relay terminal to operate in a specific operation mode based on the power of the transmitted signal higher than a threshold, and
  - the relay terminal transmits the discovery signal in the specific operation mode;
- determining the relay terminal as a transmission destination for the packet, wherein
  - the determination is based on a specific condition that is satisfied, and the reception of the discovery signal from the relay terminal, and
  - the specific condition corresponds to an elapse of the time period within which the relay terminal is one of discovered or undiscovered based on the discovery signal, since the occurrence of the transmission traffic; and
- controlling transmission of the packet to the transmission destination.

16. A method, comprising:
in a first terminal apparatus:
- transmitting a discovery request to a base station, wherein the discovery request includes identification information of the first terminal apparatus;
- receiving a discovery request response based on the transmitted discovery request;
- receiving a signal from a second terminal apparatus;
- transmitting a discovery signal to the second terminal apparatus, wherein the transmission of the discovery signal is based on a power of the received signal and the transmitted discovery request;
- setting a first time period based on the received discovery request response;
- receiving a packet from the second terminal apparatus in the set first time period; and
- relaying the packet to the base station in the set first time period, wherein
  the second terminal apparatus:
  - sets a second time period that is equal to or less than a maximum allowable delay period of the packet, and
  - determines which one of the base station or the first terminal apparatus is set as a transmission destination for the packet,
  - the determination is based on a specific condition that is satisfied, and the transmitted discovery signal to the second terminal apparatus, and
  - the specific condition corresponds to an elapse of the second time period within which the first terminal apparatus is one of discovered or undiscovered based on the discovery signal, since an occurrence of a transmission traffic.

17. A non-transitory computer-readable medium having stored thereon computer-executable instructions which, when executed by a processor of a terminal apparatus, cause the processor to execute operations, the operations comprising:
- setting, in a timer, a time period that is equal to or less than a maximum allowable delay period of a packet;
- starting the timer based on an occurrence of a transmission traffic;
- suspending transmission of the packet to a base station, wherein the suspended transmission is based on the start of the timer;
- controlling transmission of a signal to a relay terminal based on the suspended transmission of the packet;
- controlling reception of a discovery signal from the relay terminal based on a power of the transmitted signal, wherein
  - the transmitted signal causes the relay terminal to operate in a specific operation mode based on the power of the transmitted signal higher than a threshold, and
  - the relay terminal transmits the discovery signal in the specific operation mode;
- determining the relay terminal as a transmission destination for the packet, wherein
  - the determination is based on a specific condition that is satisfied, and the reception of the discovery signal from the relay terminal, and
  - the specific condition corresponds to an elapse of the time period within which the relay terminal is one of discovered or undiscovered based on the discovery signal, since the occurrence of the transmission traffic; and
- controlling transmission of the packet to the transmission destination.

18. A non-transitory computer-readable medium having stored thereon computer-executable instructions which, when executed by a processor of a first terminal apparatus, cause the processor to execute operations, the operations comprising:
- transmitting a discovery request to a base station, wherein the discovery request includes identification information of the first terminal apparatus;
- receiving a discovery request response based on the transmitted discovery request;
- receiving a signal from a second terminal apparatus;
- transmitting a discovery signal to the second terminal apparatus, wherein the transmission of the discovery signal is based on a power of the received signal and the transmitted discovery request;
- setting a first time period based on the received discovery request response;
- receiving a packet from the second terminal apparatus in the set first time period; and
- relaying the packet to the base station in the set first time period, wherein
  the second terminal apparatus:
  - sets a second time period that is equal to or less than a maximum allowable delay period of the packet, and
  - determines which of the base station or the first terminal apparatus is set as a transmission destination for the packet,
  - the determination is based on a specific condition that is satisfied, and the transmitted discovery signal to the second terminal apparatus, and the specific condition corresponds to an elapse of the second time period within which the first terminal apparatus is one of discovered or undiscovered based on the discovery signal, since an occurrence of a transmission traffic.

* * * * *